(12) United States Patent
Herrmann et al.

(10) Patent No.: US 10,800,329 B2
(45) Date of Patent: Oct. 13, 2020

(54) REAR VIEW MIRROR SIMULATION

(71) Applicant: SMR Patents S.à.r.l., Luxembourg (LU)

(72) Inventors: Andreas Herrmann, Winnenden-Baach (DE); Martin Schwalb, Neuhausen a.d.F. (DE); Frank Linsenmaier, Weinstadt (DE); Oliver Eder, Pinache (DE); Firas Mualla, Stuttgart (DE)

(73) Assignee: SMR Patents S.à.r.l., Luxmbourg (LU)

( * ) Notice: Subject to any disclaimer, the term of this patent is extended or adjusted under 35 U.S.C. 154(b) by 127 days.

(21) Appl. No.: 15/691,332

(22) Filed: Aug. 30, 2017

(65) Prior Publication Data

US 2018/0126903 A1  May 10, 2018

Related U.S. Application Data

(63) Continuation-in-part of application No. 15/602,068, filed on May 22, 2017, and a continuation-in-part of
(Continued)

(30) Foreign Application Priority Data

Apr. 19, 2010 (EP) .................................... 10160325

(51) Int. Cl.
*B60R 1/00* (2006.01)
*B60R 11/04* (2006.01)
(Continued)

(52) U.S. Cl.
CPC .............. *B60R 1/00* (2013.01); *B60Q 1/2665* (2013.01); *B60Q 9/008* (2013.01); *B60R 1/12* (2013.01);
(Continued)

(58) Field of Classification Search
CPC ............ B60R 11/04; B60R 2001/1253; B60R 2011/004; B60R 2300/30; B60R 2300/307; B60R 2300/8046; B60R 2300/306; H04N 5/23238; G06K 9/4604; G06T 3/0018; G03B 37/04
See application file for complete search history.

(56) References Cited

U.S. PATENT DOCUMENTS 5,289,321 A  2/1994 Secor
5,445,294 A  8/1995 Gardner et al.
(Continued)

FOREIGN PATENT DOCUMENTS

CA  2655727 A1  1/2008
CA  2802122 A1  12/2011
(Continued)

OTHER PUBLICATIONS

European Search Report for application No. EP 10 16 0325 dated Oct. 6, 2010.

*Primary Examiner* — Sath V Perungavoor
*Assistant Examiner* — Tyler B Edwards
(74) *Attorney, Agent, or Firm* — Jones Day

(57) ABSTRACT

The invention relates to an exterior mirror simulation with image data recording and a display of the recorded and improved data for the driver of a motor vehicle. The display on a display device shows the data in a way chosen by the driver or the vehicle manufacturer.

13 Claims, 18 Drawing Sheets

Related U.S. Application Data application No. 15/287,554, filed on Oct. 6, 2016, now Pat. No. 10,395,125, said application No. 15/602,068 is a continuation of application No. 14/968,132, filed on Dec. 14, 2015, now abandoned, which is a continuation of application No. 13/090,127, filed on Apr. 19, 2011, now Pat. No. 9,238,434.

(51) Int. Cl.

| | |
|---|---|
| G06K 9/00 | (2006.01) |
| G06T 3/00 | (2006.01) |
| B60R 11/00 | (2006.01) |
| H04N 5/357 | (2011.01) |
| G06K 9/62 | (2006.01) |
| G08G 1/017 | (2006.01) |
| B60R 1/12 | (2006.01) |
| G08G 1/16 | (2006.01) |
| B60Q 1/26 | (2006.01) |
| G06K 9/46 | (2006.01) |
| H04N 5/232 | (2006.01) |
| B60Q 9/00 | (2006.01) |
| G08G 1/01 | (2006.01) |
| G06T 5/00 | (2006.01) |

(52) U.S. Cl.
CPC .......... *B60R 11/04* (2013.01); *G06K 9/00791* (2013.01); *G06K 9/00805* (2013.01); *G06K 9/4604* (2013.01); *G06K 9/6214* (2013.01); *G06T 3/0018* (2013.01); *G06T 5/006* (2013.01); *G08G 1/0104* (2013.01); *G08G 1/0175* (2013.01); *G08G 1/166* (2013.01); *G08G 1/167* (2013.01); *H04N 5/23238* (2013.01); *H04N 5/3572* (2013.01); *B60R 2001/1253* (2013.01); *B60R 2011/004* (2013.01); *B60R 2300/105* (2013.01); *B60R 2300/207* (2013.01); *B60R 2300/30* (2013.01); *B60R 2300/307* (2013.01); *B60R 2300/8046* (2013.01); *G06T 2207/30261* (2013.01)

(56) References Cited

U.S. PATENT DOCUMENTS

| | | | |
|---|---|---|---|
| 5,949,331 A | 9/1999 | Schofield et al. | |
| 6,703,925 B2 | 3/2004 | Steffel | |
| 6,970,184 B2 | 11/2005 | Hirama et al. | |
| 7,012,550 B2 | 3/2006 | Iwakiri et al. | |
| 7,083,311 B2 | 8/2006 | Schreck et al. | |
| 7,307,655 B1 | 12/2007 | Okamoto et al. | |
| 7,366,595 B1 | 4/2008 | Shimizu et al. | |
| 7,729,507 B1 * | 6/2010 | Malachowsky .... | H04N 5/23248 348/208.1 |
| 7,734,417 B2 | 6/2010 | Chinomi et al. | |
| 7,999,992 B2 | 8/2011 | Mazurkiewicz et al. | |
| 8,031,224 B2 | 10/2011 | Linsenmaier et al. | |
| 8,395,514 B2 | 3/2013 | Linsenmaier et al. | |
| 8,460,060 B2 | 6/2013 | Wilson et al. | |
| 8,487,633 B2 | 7/2013 | Fried | |
| 8,537,451 B2 | 9/2013 | Mazurkiewicz et al. | |
| 8,740,427 B2 | 6/2014 | Fritz et al. | |
| 8,779,911 B2 | 7/2014 | Belcher et al. | |
| 8,849,104 B2 | 9/2014 | Eder et al. | |
| 8,854,231 B2 | 10/2014 | Thomas et al. | |
| 8,880,344 B2 | 11/2014 | Mathes et al. | |
| 8,979,288 B2 | 3/2015 | Negel et al. | |
| 9,181,616 B2 | 11/2015 | Evans et al. | |
| 9,238,434 B2 | 1/2016 | Eder et al. | |
| 9,656,601 B2 | 5/2017 | Evans et al. | |
| 2002/0171738 A1 | 11/2002 | Guan | |
| 2003/0085806 A1 | 5/2003 | Samman | |
| 2003/0128182 A1 * | 7/2003 | Donath ..................... | B60R 1/00 345/156 |
| 2007/0057816 A1 | 3/2007 | Sakakibara et al. | |
| 2007/0273971 A1 | 11/2007 | Waldmann et al. | |
| 2008/0159594 A1 | 7/2008 | Chiu et al. | |
| 2009/0175492 A1 * | 7/2009 | Chen ..................... | G06T 3/4038 382/100 |
| 2010/0259371 A1 | 10/2010 | Wu et al. | |
| 2010/0273063 A1 | 10/2010 | Wallace et al. | |
| 2011/0158510 A1 * | 6/2011 | Aguilar .............. | G06K 9/00718 382/159 |
| 2012/0154587 A1 | 6/2012 | Hwang | |
| 2013/0251194 A1 * | 9/2013 | Schamp .................... | G06T 7/11 382/103 |
| 2015/0130937 A1 | 5/2015 | Graumann et al. | |
| 2015/0177378 A1 | 6/2015 | Rostocki et al. | |
| 2015/0358590 A1 | 12/2015 | Hottmann et al. | |
| 2016/0096487 A1 | 4/2016 | Konevsky et al. | |
| 2016/0209000 A1 | 7/2016 | Kurschner et al. | |
| 2016/0341393 A1 | 11/2016 | Kurschner et al. | |
| 2017/0015256 A1 | 1/2017 | Henion et al. | |
| 2017/0015802 A1 | 1/2017 | Hall et al. | |
| 2017/0066379 A1 | 3/2017 | Herrmann et al. | |
| 2017/0066380 A1 | 3/2017 | Shah et al. | |
| 2017/0072839 A1 | 3/2017 | Schmidt et al. | |
| 2017/0090100 A1 | 3/2017 | Fritz | |
| 2017/0097135 A1 | 4/2017 | Fritz et al. | |
| 2017/0371036 A1 | 12/2017 | Griffin | |

FOREIGN PATENT DOCUMENTS

| | | | |
|---|---|---|---|
| CN | 103424112 A | 12/2013 | |
| DE | 10030359 | 2/2002 | |
| DE | 10043099 A1 | 3/2002 | |
| DE | 102008031784 | 4/2009 | |
| DE | 102008035429 | 4/2009 | |
| DE | 102008035429 A1 * | 4/2009 | ............... B60R 1/00 |
| DE | 102007054342 B3 | 6/2009 | |
| DE | 102011103200 A1 | 12/2012 | |
| DE | 102011053999 A1 | 3/2013 | |
| DE | 102012104529 A1 | 11/2013 | |
| DE | 102012107833 A1 | 2/2014 | |
| DE | 102012107834 A1 | 2/2014 | |
| DE | 102015115555 | 9/2015 | |
| DE | 102016107545 A1 | 10/2017 | |
| EP | 2123731 A1 | 11/2009 | |
| EP | 2301830 A1 | 3/2011 | |
| EP | 2792556 A1 | 4/2013 | |
| EP | 2738043 A1 | 6/2014 | |
| EP | 2792555 A1 | 10/2014 | |
| EP | 2933155 A1 | 10/2015 | |
| JP | 2000071877 | 7/2000 | |
| WO | 03051671 | 6/2003 | |
| WO | 2009043783 | 4/2009 | |
| WO | 2013037694 A1 | 3/2013 | |
| WO | 2016147154 A1 | 9/2016 | |
| WO | 2017174392 A1 | 10/2017 | |
| WO | 2017191033 A1 | 11/2017 | |

* cited by examiner

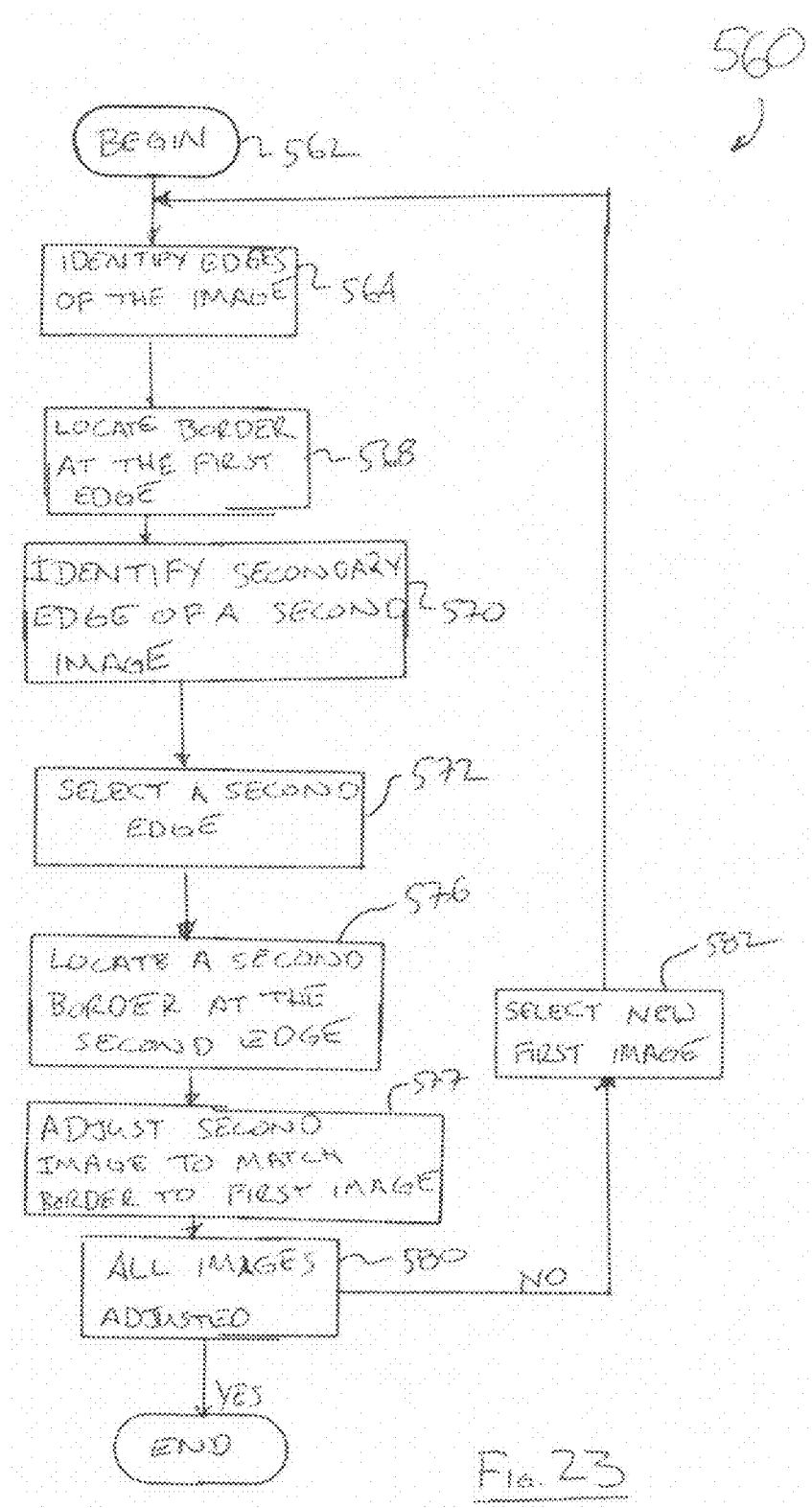

REAR VIEW MIRROR SIMULATION

This patent application is a continuation-in-part of United States patent application having application Ser. No. 15/602,068, which is a continuation of United States patent application having application Ser. No. 14/968,132, which is a continuation of U.S. patent application Ser. No. 13/090,127. Furthermore, this patent application claims the priority of U.S. Ser. No. 15/287,554, which is hereby incorporated herein by reference. The invention is based on the priority United States patent applications having application Ser. Nos. 13/090,127 and 15/287,554, respectively, which are hereby incorporated by reference.

BACKGROUND ART

1. Field of the Invention

The invention relates to an exterior mirror simulation with image data recording and a display of the recorded and improved data for the driver of a vehicle. The display on a display device shows the data in a way favored by the driver and/or vehicle manufacturer.

2. Description of the Related Art

Several solutions for recording image data and its display for the driver of a vehicle are known in the prior art. The image recording is done by one or several cameras installed in the vehicle. The different assistance systems process the data from the captured image in very different ways.

In US patent application having publication number 2008/0159594, a system is known which records images from the surroundings of the vehicle with a fish-eye lens. Image data is recorded with great distortion through this wide-angle lens. The image data recorded by the camera pixels are rectified block by block. The display of the image is done with the rectified image data, since an image of the surroundings of the vehicle is required.

A blind spot indicator is disclosed in U.S. Pat. No. 8,779,911 B2, which is adjacent to a second mirror surface of a rear-view device, commonly referred to as a called spotter area, used to observe objects located in a blind spot of the vehicle.

A camera for assisting reversing is known in DE 102008031784. The distorted camera image is edited and rectified, which leads to an undistorted image. This is then further processed, in order to optimize the perspective for reversing.

SUMMARY OF THE INVENTION

In contrast, the object of the invention is to create a display of a camera image, which corresponds to the familiar image in a rear-view mirror. The distortions of the image caused by the different mirror glasses are provided for the driver in the usual manner.

The present invention relates to image rectification for a vehicle, which comprises a display device, in order to show modified images and an imaging means and/or screen for receiving the recorded images, which have been improved by image rectification. Furthermore, the system comprises image rectification in communication with the display device and the imaging means and/or screen, so that pixels, which are located in the recorded images, are improved by reorientation or repositioning of the pixels from a first position to a second position using a transmission or transfer process.

Furthermore, the invention relates to a rear-view image improvement system for a vehicle, which includes a display device for showing modified images, which have been improved by the image improvement system, and an imaging means for receiving recorded images, which have been improved by the image improvement system. The system also comprises an image improvement module in connection with the display device and the imaging means, and indeed in such a way that pixels, which are located in the recorded images, are grouped and spread out, in order to form at least one region of interest, in which reference is made to the pixels from a base plane in the recorded image, in order to form the modified images.

Furthermore, the invention relates to a vehicle comprising displaying devices, processing devices and sensors such as cameras.

The object of the invention is to also provide an object detection and classification system with image feature descriptors derived from periodic descriptor functions.

An object detection and classification system analyzes images captured by an image sensor like a camera, a radar sensor and/or ultrasonic sensor, for a hazard detection and information system, such as on a vehicle. Extracting circuitry is configured to extract at least one feature value from one or more keypoints in an image captured by an image sensor of the environment surrounding a vehicle. A new image feature descriptor is derived from a periodic descriptor function, which depends on the distance between at least one of the keypoints and a chosen query point in complex space and depends on a feature value of at least one of the keypoints in the image.

Query point evaluation circuitry is configured to sample the periodic descriptor function for a chosen query point in the image from the environment surrounding the vehicle to produce a sample value. The sample value for a query point may be evaluated to determine whether the query point is the center of an object or evaluated to determine what type of object the query point is a part of.

If the evaluated query point satisfies a potential hazard condition, such as if the object is classified as a vulnerable road user or object posing a collision threat, a signal bus is configured to transmit a signal to alert the operator of the vehicle to the object. Additionally, or alternatively, the signal bus may transmit a signal to a control apparatus of the vehicle to alter the vehicle's speed and/or direction to avoid collision with the object.

The object detection and classification system disclosed herein may be used in the area of transportation for identifying and classifying objects encountered in the environment surrounding a vehicle, such as on the road, rail, water, air, etc., and alerting the operator of the vehicle or autonomously taking control of the vehicle if the system determines the encountered object poses a hazard, such as a risk of collision or danger to the vehicle or to other vehicles or persons in the area.

Another aspect of this invention is a rearview device and illumination means comprising different functions.

BRIEF DESCRIPTION OF THE DRAWINGS

Advantages of the invention will be readily appreciated as the same becomes better understood by reference to the following detailed description when considered in connection with the accompanying drawings, wherein:

FIG. 23 is a logic diagram of a method employed to stitch multiple image captures together.

DETAILED DESCRIPTION OF THE DRAWINGS

Figure 1:
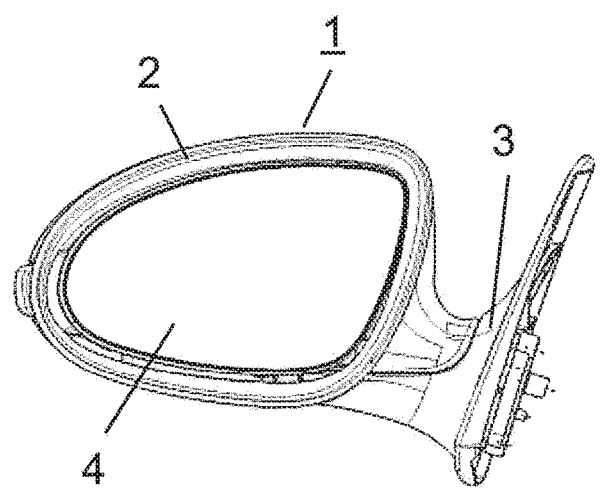
FIG. 1 shows an exemplary exterior mirror.

FIG. 1 shows an exterior mirror 1, which comprises a mirror head 2, which is connected to a vehicle by a mirror base or bracket 3. The mirror head 2 forms the and opening and/or slot for a mirror glass 4.

The size of the mirror glass is determined by the mounting on the vehicle, as well as by the different legal regulations about the available field of view. In this process, different glass types for different regions have developed. In the USA, a flat plane glass is used on the driver side.

Figure 2:
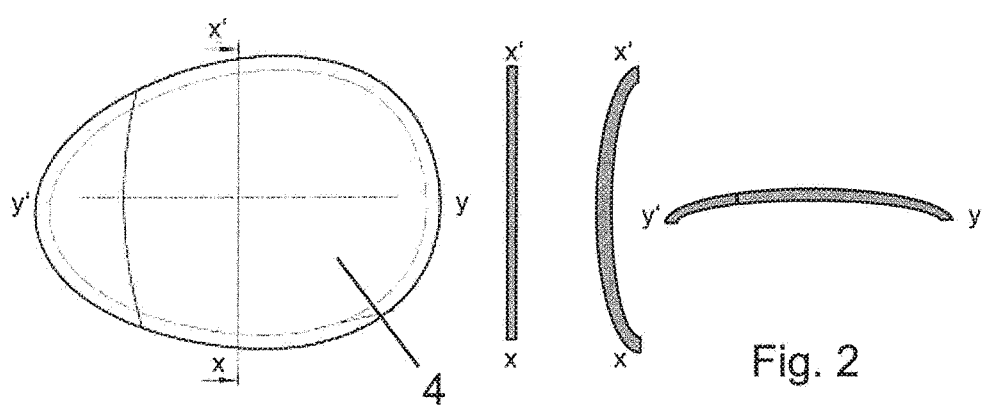
FIG. 2 shows examples of different mirror types.

A mirror glass 4 with a curvature radius is shown in FIG. 2. The glass in FIG. 2 can be used in mirror assemblies on the passenger side of the vehicle and on the driver side of the vehicle in countries other than the USA. Convex mirror glasses as well as glass with an aspherical part are used in addition to convex glass.

The driver of a vehicle is used to the display of each type of exterior mirror, and therefore can deduce for himself the warning information which he needs to steer the vehicle through the traffic.

Alternatively, or in addition, the mirror and/or the display device can comprise an additional display or part of a display and/or illumination means within and/or surrounding at least parts of the mirror and/or the display device to convey additional information to the driver or other persons looking at the mirror and/or the display device. This additional information can enhance the perception of the current situation, for example the situation typically depicted in an exterior mirror, by providing detailed information, for example about the surroundings of the vehicle, for example a blind spot indicator, a traffic jam indicator, a weather indicator, an object distance indicator and/or about parameters of the vehicle, for example the speed of the vehicle, the driving direction of the vehicle, the vehicle mode, a warning indicator. For this a graphical representation can be used, for example a color scale.

Figure 3A:
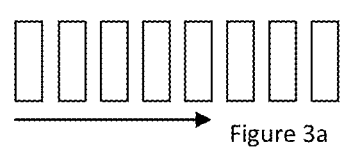
FIG. 3a-3k show exemplarily different forms of color scales.
Figure 3B:
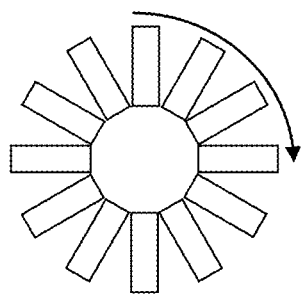
Figure 3C:
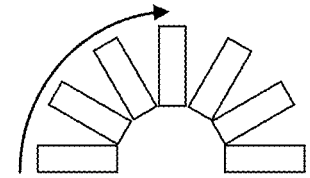
Figure 3D:
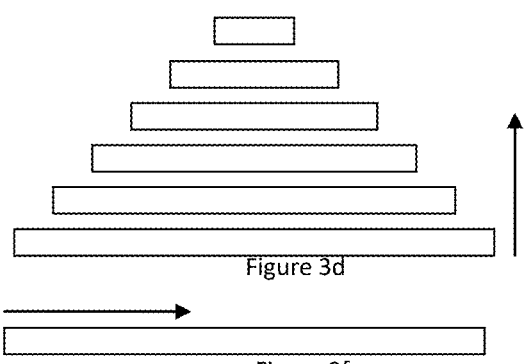
Figure 3E:
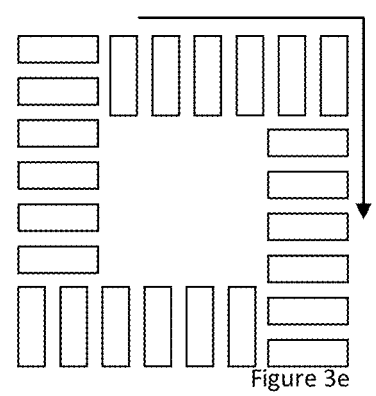
Figure 3F:
Figure 3I:
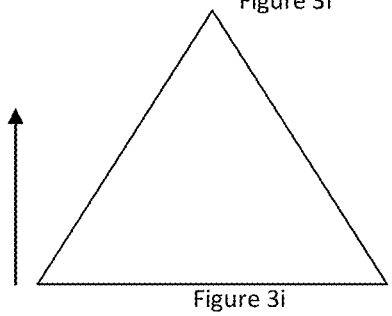
Figure 3G:
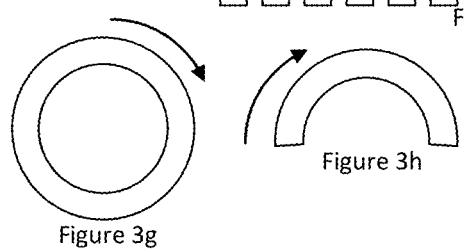
Figure 3H:
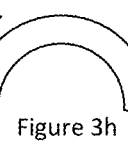
Figure 3J:
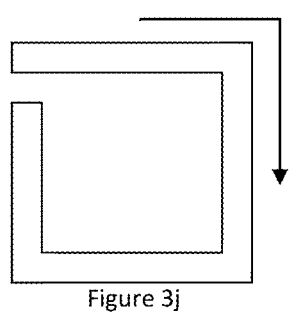
Figure 3K:
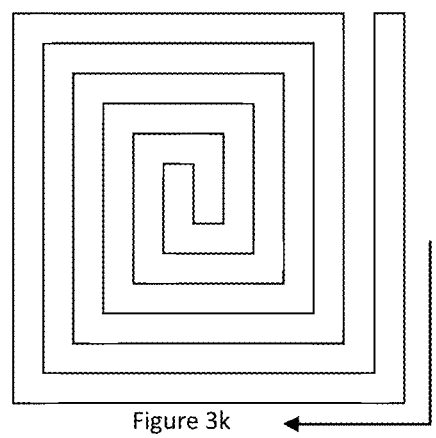

The color scale can take various forms, comprising for example a multitude of elements, for example arranged vertically as shown for stripes in FIG. 3a, arranged in a circle as shown for stripes in FIG. 3b, arranged in a half-circle as shown for stripes in FIG. 3c, arranged in a triangle shape as shown for stripes in FIG. 3d, arranged in a rectangular shape as shown for stripes in FIG. 3e. The shape of the elements can also vary and is not limited to the shown stripes, comprising for example triangles, circles, squares, 2D and/or 3D representations of 3D objects, for example cubes, boxes, pyramids and many more.

The scale can also comprise just a single element, becoming smaller or larger and/or changing colors. Preferably the single element comprises a continuous changing color scale, of which several possible embodiments are shown in FIGS. 3f-3k.

At the same time, a number representation of the parameter and/or the parameter range can be displayed next to the scale to increase the perception by the driver. The orientation of the scale can be chosen either horizontal, vertical and/or at any angle in between.

The size, shape color and volume of the graphical representation can also change with the at least one parameter of the vehicle and/or environment, such that for example a single or multiple elements fade away, disappear and/or appear. The arrows shown in the FIGS. 3a-3k indicates exemplarily the direction of such possible changes.

The graphical representations, for example those shown in FIGS. 3a-3k, can also be used to be placed adjacent to and/or surrounding and/or in close proximity to a present spotter area and/or a mirror and/or part of a mirror of a rear-view device, irrespective if an actual mirror or a mirror replacement, such as a display, is used.

In all embodiments, the changes can also be carried out on multiple parts and in multiple directions, sequentially or at the same time Exterior mirrors contribute to the overall wind resistance of the vehicle. The aerodynamics of a vehicle are influenced by the exterior mirror. Therefore, it is sensible to replace it with the camera system that provides the same field of view while reducing the adverse effect on aerodynamics, and so to minimize the total CO2 emissions of the vehicle, by reducing the turbulent flows around the vehicle, and creating a predominantly laminar flow.

Figure 4:
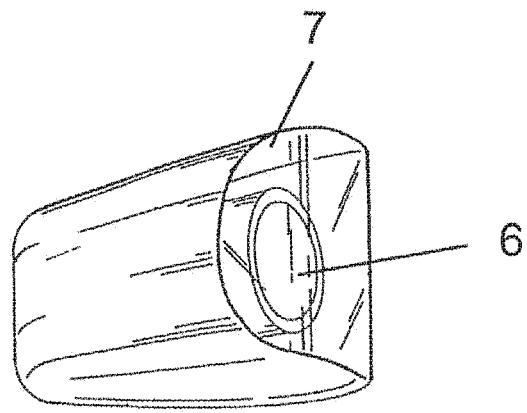
FIG. 4 shows a camera installation.

FIG. 4 shows a possible installation of a rear-view assembly, generally indicated at 10 in a vehicle. The optical sensor 6, of which only the optic lens can be seen in the Figure, is enclosed in a housing 7. The housing 7 is tightly mounted to a vehicle 8, best seen in FIG. 5. The housing 7 has a form which is streamlined on the vehicle 8. The optical sensor itself is installed in the housing 7, and has a watertight seal against weather effects, as well as against the influence of washing processes with detergents, solvents and high-pressure cleaners.

Figure 5:
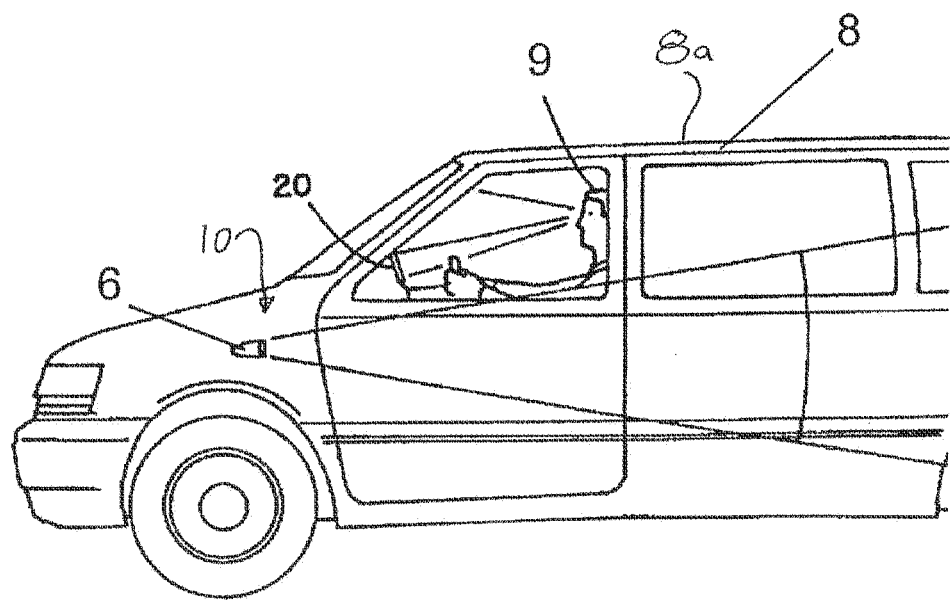
FIG. 5 shows an exemplary vehicle.

The housing 7 comprises an opening, through which the camera cabling is led. In this process, the connection of the camera to the electric system of the vehicle 8 is done by any bus system or a separate cable connection. FIG. 5 shows as an example the attachment position of a sensor in the housing 7 on the vehicle 8. The camera position is therefore to be chosen in a way that fulfils the legally required field of view. The position can therefore be on the front mudguard, on the mirror triangle or on the edge of the vehicle roof 8a. Through the application of a wide-angle lens it is possible that the field of view of the sensor will be larger than through a conventional mirror.

A display device 20, which can be seen by the driver 9, is mounted into a vehicle 8. The picture from the camera is transmitted to the display device 20. In one embodiment, the display device 20 is mounted to an A-pillar 21 of the motor vehicle 8.

Figure 6:
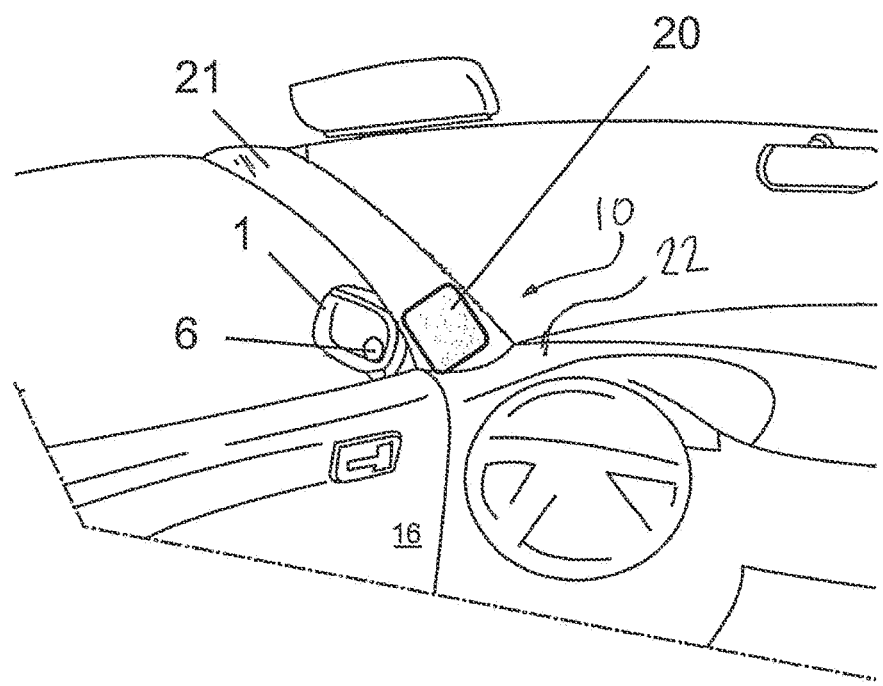
FIG. 6 shows a display in the vehicle.

FIG. 6 shows an exemplary embodiment of the present invention 10 with a display device 20, which is provided in the vehicle cab or vehicle interior for observation or viewing by the driver 9. The rear-view assembly 10 delivers real-time wide-angle video images to the driver 9 that are captured and converted to electrical signals by the optical sensor 6. The optical sensor 6 is, for example, a sensor technology with a Charge-Coupled Device ('CCD') or a Complementary Metal Oxide Semiconductor ('CMOS'), for recording continuous real-time images. In FIG. 6, the display device 20 is attached to the A-pillar 21, so that the familiar look in the rear-view mirror is led to a position which is similar to the familiar position of the exterior mirror used up to now.

In the event of mounting on the A-pillar 21 being difficult due to the airbag safety system, a position on the dashboard 22 near to the mirror triangle or the A-pillar 21 is also an option. The display device shows the real-time images of camera 6, as they are recorded in this example by a camera in the exterior mirror.

The invention is not dependent on whether the exterior mirror is completely replaced, or, as it is shown in FIG. 6, it is still available as additional information. The optical sensor 6 can look through a semitransparent mirror glass.

Figure 7:
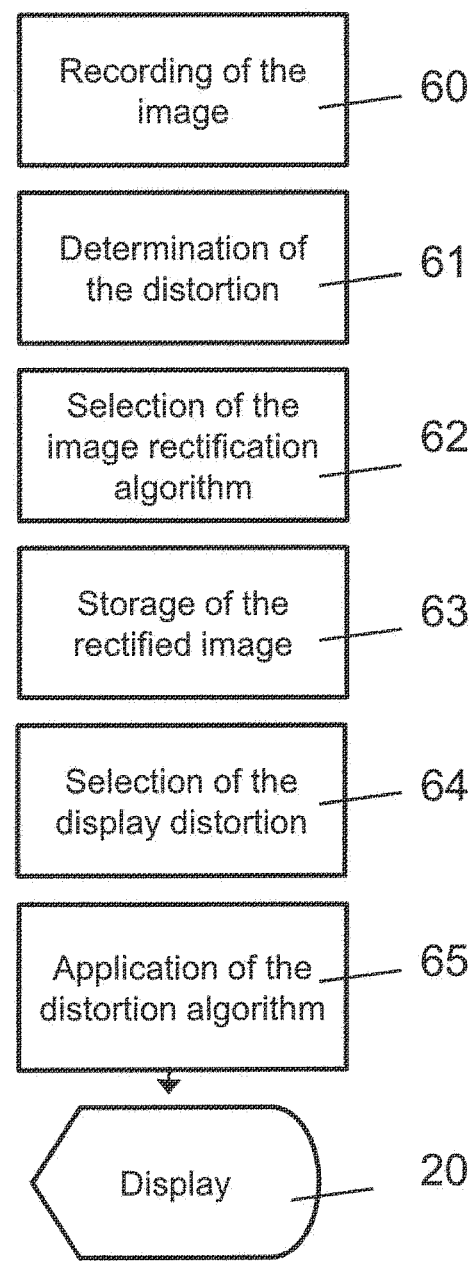
FIG. 7 shows the process of image capture.

The field of view recorded by an optical sensor 6 is processed and improved in an image rectification module, which is associated with the rear-view assembly 10, according to the control process shown in FIG. 7. The image rectification module uses a part of the vehicle 8 as a reference (e.g. a part of the vehicle contour) when it modifies the continuous images, which are transmitted to the display device 20 as video data. The display device 20 can be a monitor, a liquid crystal display device or a TFT display, or LCD, a navigation screen or other known video display devices, which in the present invention permit the driver 9 to see the area near to the vehicle 8. The application of OLED, holographic or laser projection displays, which are adapted to the contour of the dashboard or the A-pillar 21, are also useful.

The image rectification occurs onboard the vehicle 8, and comprises processing capacities, which are carried out by a computation unit, such as, for example, a digital signal processor or DSP, a field programmable gate array ('FPGA'), microprocessors or circuits specific to use, or application specific integrated circuits ('ASIC'), or a combination thereof, which show programmability, for example, by a computer-readable medium such as, for example, software or hardware, which is recorded in a microprocessor, including Read Only Memory ('ROM'), or as binary image data, which can be programmed by a user. The image rectification can be formed integrally with the imaging means 20 or the display device 14, or can be positioned away in communication (wired or wireless) with both the imaging means as well as the display device.

The initiation or starting up of the image rectification occurs when the driver starts the vehicle. At least one display device 20 displays continuous images from the side of the vehicle, and transmits the continuous images to the image rectification device. The image rectification device modifies the continuous images and transmits the improved images by video data to the display device 20, in order to help the driver.

The individual steps of image rectification as well as image distortion are shown in FIG. 7. In this process, the invention distorts the image of the wide-angle camera and applies post-distortion to this image, in order to give this image the same view as that of the desired mirror glass.

The first step is the recording of the image. In a second step, the type of distortion, to which the image is subjected, is determined.

In a further step, the algorithm is selected, which is adapted to the present distortion. An example is explained in DE 102008031784.

An optical distortion correction is an improving function, which is applied to the continuous images. The optical distortion correction facilitates the removal of a perspective effect and a visual distortion, which is caused by a wide-angle lens used in the camera 6. The optical distortion correction uses a mathematical model of the distortion, in order to determine the correct position of the pixels, which are recorded in the continuous images. The mathematical position also corrects the pixel position of the continuous images, as a result of the differences between the width and height of a pixel unit due to the aspect or side ratio, which is created by the wide-angle lens.

For certain lenses, which are used by the camera 6, the distortion co-efficient values k1 and k2 can be predetermined, in order to help in eliminating the barrel distortion, which is created by the use of a wide-angle lens. The distortion co-efficient values are used for the real-time correction of the continuous images.

The distortion co-efficient values k1 and k2 can be further adjusted or coordinated by using an image, which is recorded in the continuous images, which shows the known straight line, for example, the lane markings on a road. According to this aspect of the present invention, the distortion center is registered by analysis of the recorded continuous images in the search for the straightest horizontal and vertical lines, whereby the center is situated where the two lines intersect. The recorded image can then be corrected with varied or fine-tuned distortion co-efficient values k1 and k2 in a trial and error process. If, for example, the lines on one side of the image are "barrel distorted" ("barreled") and lines on the other side of the image are "pin cushion distorted" ("pin-cushioned"), then the center offset must move in the direction of the pin-cushioned side. If a value is found, which sufficiently corrects the distortion, then the values for the distortion center 42 and the distortion coefficient values k1 and k2 can be used in the mathematical model of optical distortion correction.

Figure 8:
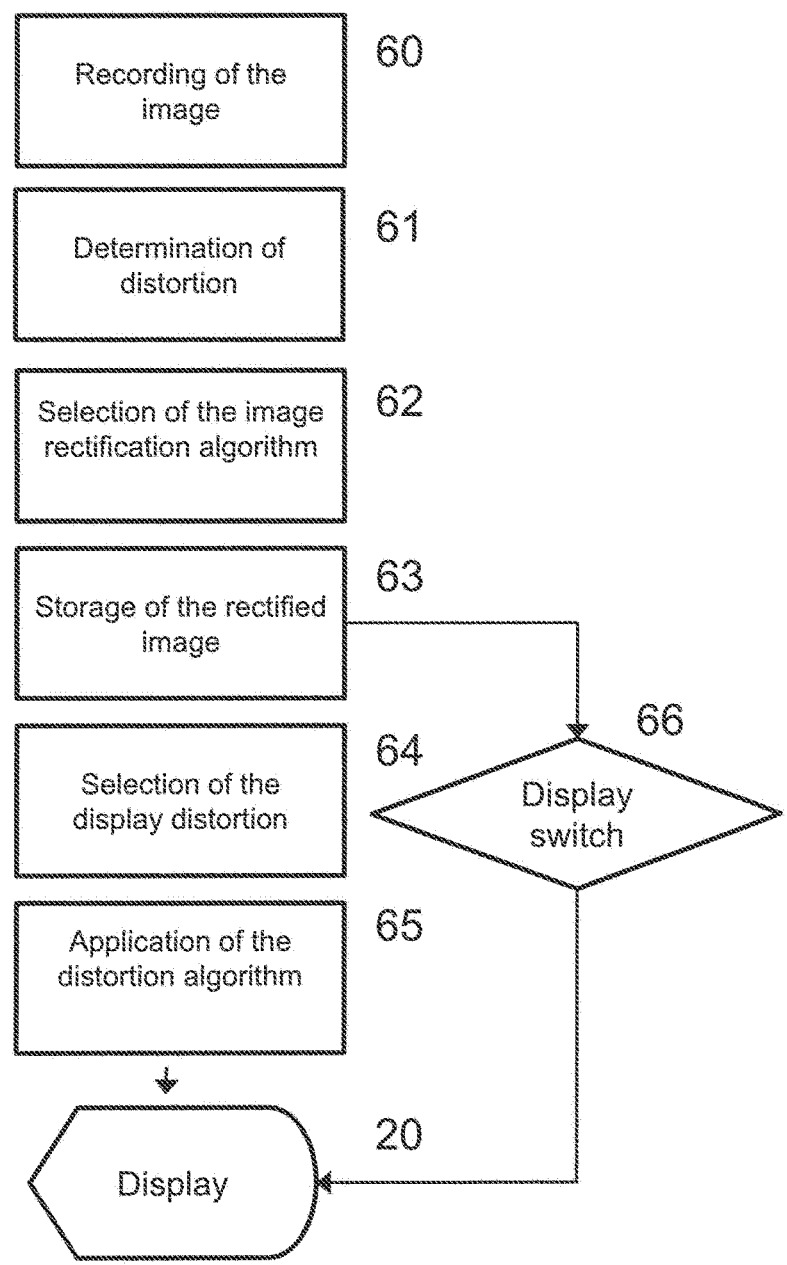
FIG. 8 shows an alternative process.
Figure 9:
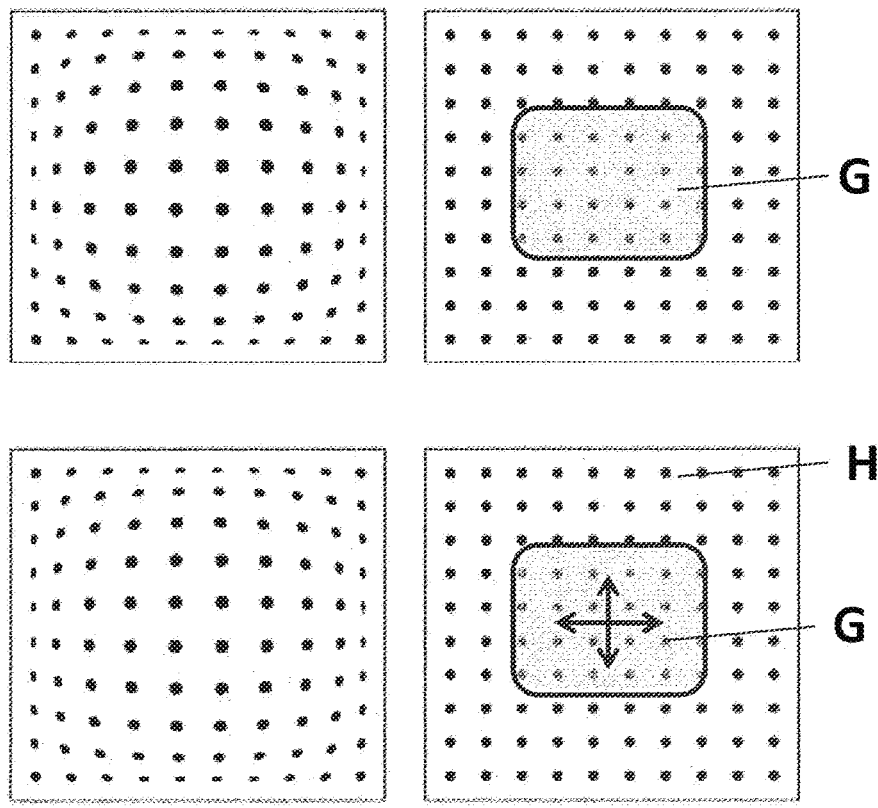
FIG. 9 shows distorted and rectified pixel areas.

As a result of the rectification stage at 63, a low-error image is given at 64, which can be shown on the display device 20. The image obtained after rectification corresponds to the image of a plane mirror, whereby the simulated mirror surface would be larger than the usual mirror surface. If such a plane mirror is simulated, the further steps are eliminated and the data is displayed directly on the display according to FIG. 8. The image of a plane mirror is defined by a selection of pixels of the optical sensor. In this way, as shown in FIG. 9, only the pixels in the middle of the optical sensor are chosen. In order to simulate the plane mirror in a larger approximation on the hardware mirror, data must be cut, and the section is limited to a section in the middle of the image.

The operator which is applied to the pixels in order to achieve the desired image is determined in the next step 64. For example, the algorithm is selected in order to again distort the low-error image as would be shown in mirror glass with an aspheric curve, for example. Therefore, the pixel values must be moved in a certain area in order to obtain the impression of curved mirror glass.

In the next step 65, the post-distortion of the present image is carried out. For example, a plane mirror with a convex additional mirror is chosen. For this purpose, a defined number of pixels is chosen for the display of the plane mirror surface. In FIG. 9 it is area G which shows plane surfaces in the middle of the optical sensor. For the display of information from the convex mirror, all pixels of the sensor must be used, both area G as well as H, in order to provide data to the wide-angle representation of the image, which is situated in a defined area of the display.

The information from all pixels is subject to a transformation, and the image of all pixels is distorted and shown on a small area of the display. In this process, information is collated by suitable operators in order to optimally display the image on a lower number of display pixels.

The base plane is a plane surface comprising pixels from the captured images. The vision sphere and the cylinder are two other types of surfaces, the captured images can be projected onto to build up different parts of the displayed output image.

In this way one or more captured images of one or more optical sensors are displayed to a drive in a joint output image shown on the display device. In this way, although differently distorted areas are existing within the shown output image, a homogenous image is presented to the driver. Especially the areas within the image can have different wide-angle distortions. In this way, it is possible to present an output image already known for the driver from rear view systems comprising a combination of different types of mirrors, like a combination of a mirror with a plane glass surface fading to a mirror having a curved surface, like an aspheric curvature. Such mirrors have a wide-angle area by which a picture is generated that has a view angle that is increased in comparison to the view angle of the human eye, i.e. is distorted. In the post distortion step a first sector of the image area having a first distortion that is located adjacent to another image area having a different second distortion compared to the first distortion is modified in the following way. In the first sector, the first area is homogenized with the adjacent second area. For this purpose, pixels that are located within captured images are grouped and separated to define a field of interest. This field of interest might comprise also the complete image and/or the complete first area. In this field of interest reference is made to the pixels of a base plane of the captured image/images to build up modification zones within the displayed output image. Instead of the base plane reference to pixels of a vision sphere or of a cylinder can be made onto which the captured images are projected to build up the different parts of the displayed output image. In these modification zones, especially the extension of the image is reduced in the wide-angle direction to adapt the first sector and/or the first image area to the second image area. One or more of such modification zones maybe provided. Such modification zones may also be provided in more than one sector and/or area of the displayed output image such that 2 or more areas are modified with respect to each other. Especially a plurality of image areas/sectors might comprise modification zones.

Different known projection methods can be used. A projection is a mapping of one mathematical set, for example an image or a plane, onto another mathematical set. Among the well-known projections are for example homography projections, rectangular projections, Mercator projections, gnomic projections, stereographic projections, equidistant projections, orthographic projections and many more. The reference to the base plane, the vision sphere and/or the cylinder is for example carried out such that the areas and/or sectors of the displayed output image, especially boundary parts of the areas and/or sectors are mathematically described by a homography projection onto the base plane, rectangular projection, Mercator projection or gnomic projection of the vision sphere or the base plane onto the output image plane. Alternatively or additionally the reference to the base plane, the vision sphere and/or the cylinder is carried out by a, especially with regard to the image area and/or sector globally or locally weighted, vector sum, of one or more of the before described projections and/or a stereographic projection, equidistant projection, orthographic projection, a projection with a constant dihedral angle, a fish eye projection of the vision sphere or the base plane onto the output image plane.

All operations described up to now as well as the operations described in the following present a defined image whilst the vehicle is in motion and/or not moving. The image is adjusted depending on the application of the vehicle.

A method to produce a single image area from multiple, eventually overlapping images, each provided from a different image capturing device, is now presented in detail.

Afterwards two methods to match the edges of two or more bordering image areas, for example to simulate and display an image representing a plane mirror with an additional mirror and creating a quite seamless transition between them, are also presented.

The methods are based on mapping a surface model of the environment to the envisaged output image area via different well-known mapping functions.

Figure 10:
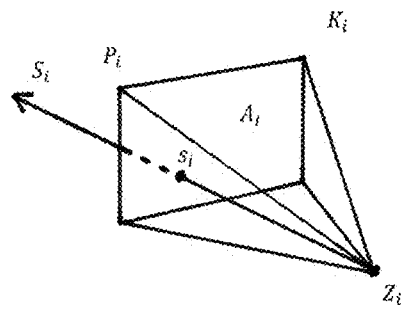
FIG. 10 shows the basic model of an image capturing device.

As shown in FIG. 10, an image capturing device $K_i$ (the subscript i numbers different image capturing devices) can be characterized by its technical projection center $Z_i$, the captured image $A_i$ and a known mathematical projection model, the mapping function $P_i$. The mapping function maps each line of sight $S_i$, emerging from the technical projection center and directed to the environment, to exactly one point $s_i$ on the image area $A_i$. The inverse mapping function $P_i^{-1}$ is then also known.

Figure 11:
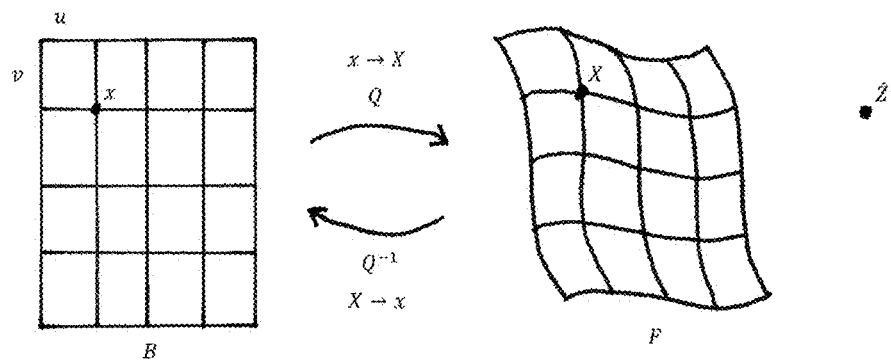
FIG. 11 shows the relationship between output image and surface model.

The environment seen by the image capturing devices can be modeled as a 2-dimensional, arbitrarily formed, e.g. curved, surface F within the 3-dimensional space. As can be seen in FIG. 11, each point x in the 2-dimensional output image area B corresponds to a single point X on the 3-dimensional surface F, related via the mapping function Q: X=Q(x).

When several imaging capturing devices are used, it is not a trivial task to combine the images of individual image capturing devices to a single image area and display it on a display without introducing errors, ambiguities, distortions and/or general image mismatches which can distract or confuse the viewer.

However, it is the surprising finding of the present disclosure that, when several image capturing devices are positioned in such a way that their respective projection centers are very close to the same space point, a common technical projection center $\hat{Z}$ can be used to create a technically simplified and idealized projection model $\hat{P}_i$ for each image capturing device $K_i$ (the subscript i denotes the different image capturing devices). Then each line of sight $\hat{S}$ emerging from the common technical projection center $\hat{Z}$, directed to the environment and passing through the area of the image $A_i$ is mapped on exactly one point $\hat{s}_i$ of the image $A_i$. Each inverse mapping function $P_i^{-1}$ can be analogously transferred to an inverse mapping function $\hat{P}_i^{-1}$, related to the common technical projection center $\hat{Z}$.

Figure 12:
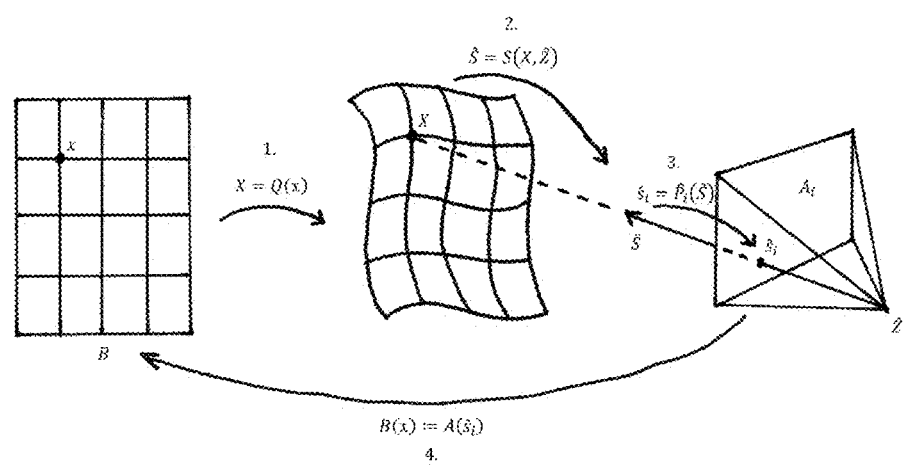
FIG. 12 shows a method to produce a single image area from multiple images.

The method to produce a single image area from multiple, eventually overlapping images, each provided from a different image capturing device, is performed using the following steps, as depicted in FIG. 12:

For each target point x in the 2-dimensional output image area B the value B(x), which can be for example a color or brightness value, has to be generated. For this first the point X on the 3-dimensional surface F is determined via the mapping function Q (X=Q(x)), as well as the line of sight $\hat{S}$ emerging from the common technical projection center and directed to the point X ($\hat{S}=S(X,\hat{Z})$). Then for each image capturing device $K_i$, which captured image $A_i$, the mapping function $\hat{P}_i$ is used to determine the position $\hat{s}_i$ ($\hat{s}_i = \hat{P}_i(\hat{S})$). This position can now be either within or outside of the image $A_i$. When inside a specific image $A_i$, the corresponding value $A_i(\hat{s}_i)$ is extracted. Depending on the technical realization, the value $A_i(\hat{s}_i)$ can for example be a scalar brightness value, a RGB vector or a vector of a different color space. In case the position $\hat{s}_i$ does not have a corresponding value $A_i(\hat{s}_i)$ within the image $A_i$, the value $A_i(\hat{s}_i)$ can be determined from existent neighboring position values, for example by interpolation.

Figure 13:
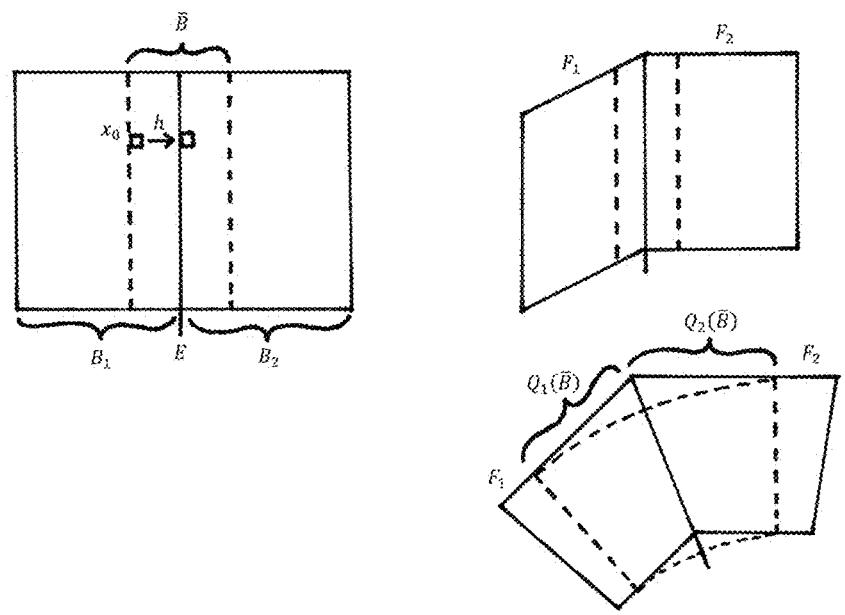
FIG. 13 shows a first method to match the edges of two or more bordering image areas.

The value B(x) can now be determined by considering all the values $A_i(\hat{s}_i)$ which have been found. Different techniques and functions can be appropriate. For example, it can be appropriate to select a single imaging device $K_j$ and only take the corresponding value $A_j(\hat{s}_i)$):B(x):=$A_j(\hat{s}_i)$. But it can also be appropriate to use the weighted sum with a specific weight $w_i$: B(x):=$\Sigma_i$ $w_i$*$A_i(\hat{s}_i)$ The first method to match the edges of two or more bordering image areas and to create a quite seamless transition between them, is exemplarily realized with two images in the following way and depicted in FIG. 13.

It is based on the adaption of neighboring parts of the bordering image areas by defining an adapted mapping function.

Given two bordering image areas $B_1$ and $B_2$ with the common edge E, the respective surfaces $F_1$, $F_2$ and the mapping functions $Q_1$, $Q_2$. $\overline{B}$ is the area to be matched, extends along the edge and consists of equal sized parts $\overline{B}_1 \subset B_1$, $\overline{B}_2 \subset B_2$, such that $\overline{B}=\overline{B}_1 \cup \overline{B}_2$, $|B_1|=|B_2|$ and $E \subset \overline{B}$. $\overline{F}_1$ ($\overline{F}_2$) denotes the part of $F_1$ ($F_2$) belonging to $\overline{B}_1$ ($\overline{B}_2$). Then one can define an adapted mapping function $\overline{Q}_1$ for the part $\overline{B}_1$:

$$\hat{Q}_1(x) = w_1(x) * Q_1\left(x_0 + \frac{x-x_0}{2}\right) + w_2(x) * Q_2\left(x_0 + \frac{x-x_0}{2} + h\right)$$

Where the weight $w_1(x)$ decreases gradually from 1.0 to 0.5 and $w_2(x)$ gradually increases from 0.0 to 0.5 in the direction from $\overline{B}_1$ to $\overline{B}_2$ and for all positions $w_1(x)+w_2(x)=1$ is valid. The 2-dimensional vector h relates the "first" element of $\overline{B}_1$, $x_0$ with the first element of $\overline{B}_2$ in the direction of adaption. In the same way, one can define an adapted mapping function $\overline{Q}_2$ for the part $\overline{B}_2$:

$$\hat{Q}_2(x) = w_1(x) * Q_1\left(x_0 + \frac{x-x_0}{2}\right) + w_2(x) * Q_2\left(x_0 + \frac{x-x_0}{2} + h\right)$$

with the same $x_0$ and h and wherein the weight $w_1(x)$ decreases gradually from 0.5 to 0.0 and $w_2(x)$ gradually increases from 0.5 to 1.0 in the direction from $\overline{B}_1$ to $\overline{B}_2$ and for all positions $w_1(x)+w_2(x)=1$ is valid.

In this way, the adapted mapping functions $\hat{Q}_1$ and $\hat{Q}_2$ implicitly define surfaces which depict a gradually transiting 3-dimensional mixture of the surfaces $\overline{F}_1$ and $\hat{F}_2$.

Figure 14:
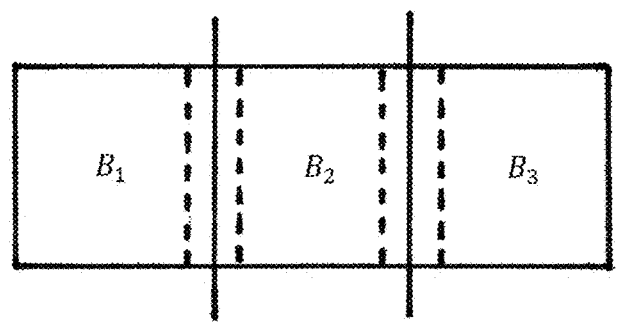
FIG. 14 shows the adaption of the first method to multiple image areas, when only independent edges exist.

This method can be straightforward used to adapt multiple image areas, when only independent edges exist, as shown in FIG. 14.

When multiple image areas with not only opposing edges should be adapted, on can easily first adapt all image areas in one direction and then adapt the image areas along the second direction.

Figure 15:
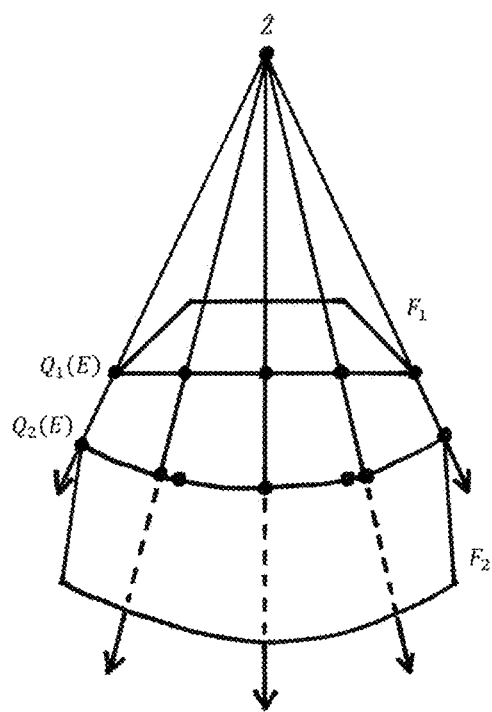
FIG. 15 shows a part of a second method to match the edges of two or more bordering image areas.
Figure 16:
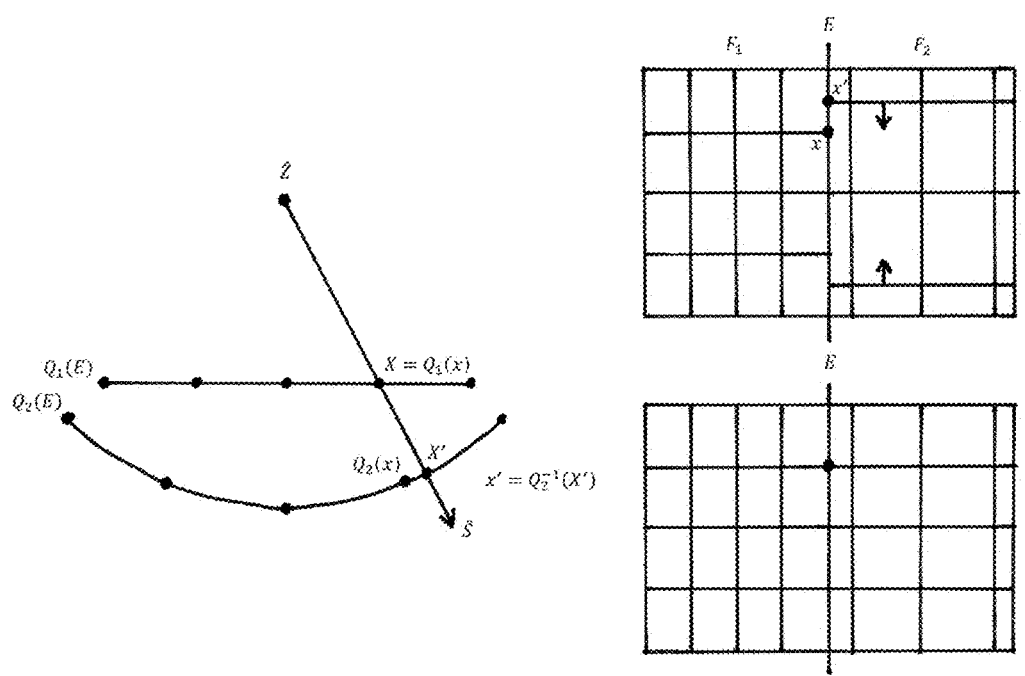
FIG. 16 shows another part of the second method to match the edges of two or more bordering image areas.

The second method to match the edges of two or more bordering image areas and to create a quite seamless transition between them, is exemplarily realized with two images in the following way and depicted in FIGS. 15 and 16.

It is based on the adaption of a neighboring part of one of the bordering image areas and keeping the other image area fixed. For this the mapping function is adapted.

Given two bordering image areas $B_1$ and $B_2$ with the common edge E, the respective surfaces $F_1$, $F_2$ and the mapping functions $Q_1$, $Q_2$ and the inverse mapping function $Q_2^{-1}$. Without the loss of generality $B_1$ is chosen to be fixed and $B_2$ will be adapted. For each x=(u, v)∈E there exists also a x'=(u, v')∈E with the same horizontal coordinate u but in general different vertical coordinate v'≠v, such that $$S(Q_1(x),\hat{Z})=S(Q_2(x'),\hat{Z}).$$

By now identifying the column v' from the original description of image area $B_2$ and moving it to the adapted area of image area $B_2$, as nearly seaming less transition between the two image areas can be reached. For this first the position X on the surface $F_1$ is identified by X=$Q_1$(x). This position is on the line of sight $\hat{S}=S(X,\hat{Z})$. Because the surface $F_2$ is also defined at this point, the crossing point X' of $\hat{S}$ with $F_2$. With the help of the inverse mapping function the point x' in $B_2$ can be calculated: x'=$Q_2^{-1}$(X'). Therefore, a function $f$ can be defined, assigning each point $\tilde{x}=(\tilde{u}, \tilde{v})$ from $B_2$ den the point $\tilde{x}'=(\tilde{u}, \tilde{v}')$ with the same $\tilde{u}$, but from the column $\tilde{v}'$. In this way, the content of the column $\tilde{v}$ of $B_1$ is "extended".

The adapted mapping function $\hat{Q}_2$ can now be defined as $\hat{Q}_2(x)=Q_2(f(x))$.

When faced with the task to match several image areas, it is clear that one image area cannot be adapted to two opposite bordering image areas at the same time. Therefore, it is necessary to consecutively match the image areas. This also works for matching image areas in a 2-dimensional matrix arrangement, but it has to be taken care not to create a situation, in which an image area which is to be adapted, already has two identified neighboring image areas on opposing edges. In general, the sequence, in which the areas will be adapted, will lead to different end results.

The before described modification might be applied alternatively or in addition to a second sector of the second area being located adjacent to the first sector of the first area.

The implementations disclosed herein also relate to an object detection and classification system for use in a variety of contexts. The present disclosure contains feature descriptor that combines information relating to what a feature is with information relating to where the feature is located, especially within the captured image, with respect to a query point. This feature descriptor provides advantages over prior feature descriptors because, by combining the "what" with the "where," it reduces the resources needed to detect and classify an object because a single descriptor can be used instead of multiple feature descriptors. The resulting system therefore is more efficient than prior systems, and can more accurately detect and classify objects in situations where hardware and/or software resources are limited.

Figure 17:
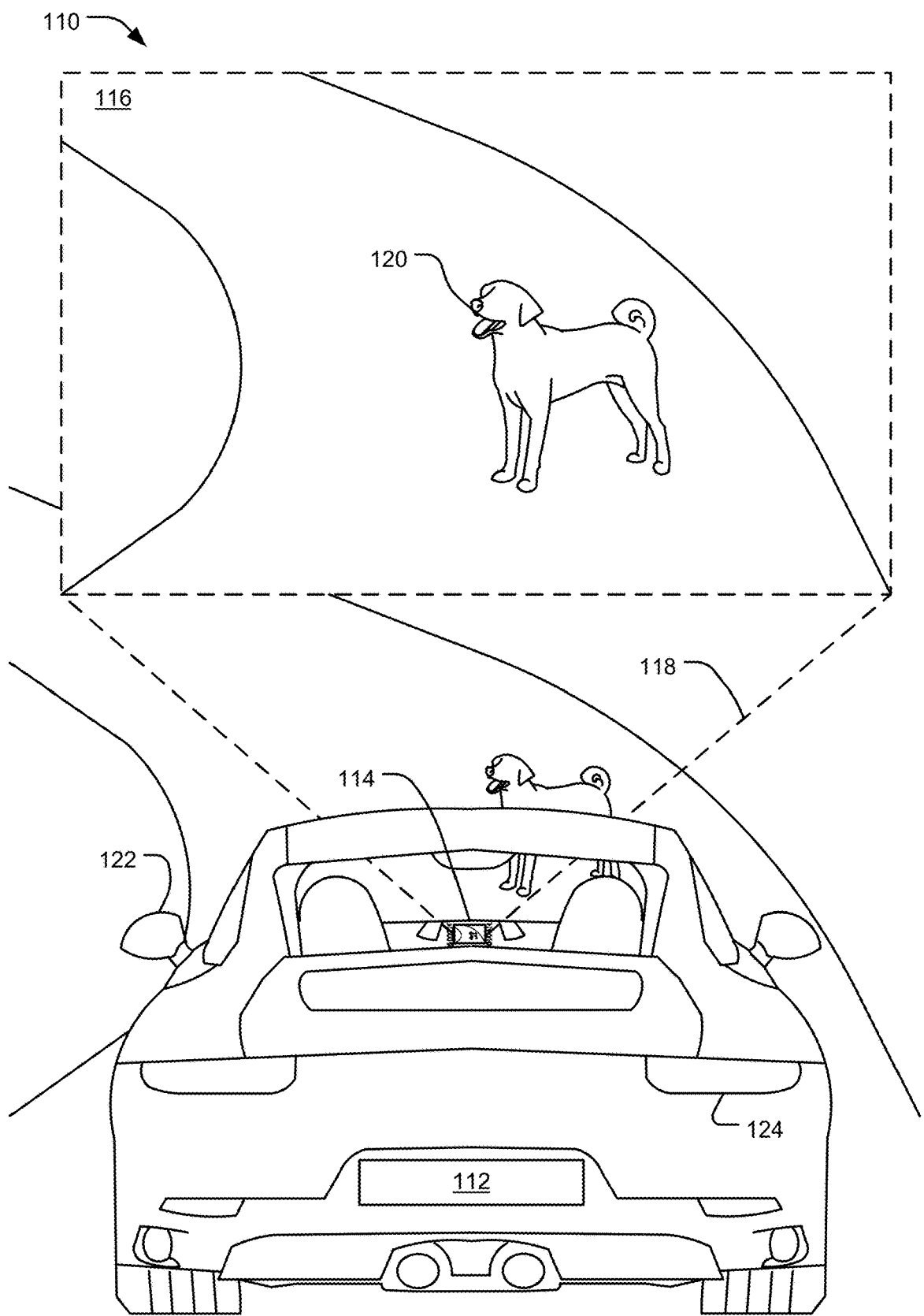
FIG. 17 illustrates a rear view of a vehicle with an object detection and classification system.

FIG. 17 illustrates a rear view of a vehicle 112 with an object detection and classification system 110 according to the present disclosure. The vehicle 112 includes an image sensor 114 to capture an image 116 of the environment surrounding the vehicle 112. The image may include a range of view through an angle 118, thus the image 116 may depict only a portion of the area surrounding the vehicle 112 as defined by the angle 118. The image 116 may include an object 120. The object 120 may be any physical object in the environment surrounding the vehicle 112, such as a pedestrian, another vehicle, a bicycle, a building, road signage, road debris, etc. The object detection and classification system 110 may assign a classification to the object 120. The classification may include the type of road object, whether the object is animate or inanimate, whether the object is likely to suddenly change direction, etc. The object detection and classification system 110 may further assign a range of characteristics to the object 120 such as a size, distance, a point representing the center of the object, a velocity of the object, an expected acceleration range, etc.

The image sensor 114 may be various types of optical image sensors, including without limitation a digital camera, a range finding camera, a charge-coupled device (CCD), a complementary metal oxide semiconductor (CMOS) sensor, or any other type of image sensor capable of capturing continuous real-time images. In an implementation, the vehicle 112 has multiple image sensors 114, each image sensor 114 may be positioned so as to provide a view of only a portion of the environment surrounding the vehicle 112. As a group, the multiple image sensors 114 may cover various views from the vehicle 112, including a front view of objects in the path of the vehicle 112, a rear-facing image sensor 114 for capturing images 116 of the environment surrounding the vehicle 112 including objects behind the vehicle 112, and/or side-facing image sensors 114 for capturing images 116 of object next to or approaching the vehicle 112 from the side. In an implementation, image sensors 112 may be located on various parts of the vehicle. For example, without limitation, image sensors 112 may be integrated into an exterior mirror of the vehicle 112, such as on the driver's exterior side mirror 122. Alternatively, or additionally, the image sensor 112 may be located on the back of the vehicle 112, such as in a rear-light unit 124. The image sensor 112 may be forward-facing and located in the interior rear-view mirror, dashboard, or in the front headlight unit of the vehicle 112.

Upon capture of an image 116 of the environment surrounding the vehicle 112, the object detection and classification system 110 may store the image 116 in a memory and perform analysis on the image 116. One type of analysis performed by the object detection and classification system 110 on the image 116 is the identification of keypoints and associated keypoint data. Keypoints, also known as interest points, are spatial locations or points in the image 116 that define locations that are likely of interest. Keypoint detections methods may be supplied by a third-party library, such as the SURF and FAST methods available in the OpenCV (Open Source Computer Vision) library. Other methods of keypoint detection include without limitation SIFT (Scale-Invariant Feature Transform). Keypoint data may include a vector to the center of the keypoint describing the size and orientation of the keypoint, and visual appearance, shape, and/or texture in a neighborhood of the keypoint, and/or other data relating to the keypoint.

A function may be applied to a keypoint to generate a keypoint value. A function may take a keypoint as a parameter and calculate some characteristic of the keypoint. As one example, a function may measure the image intensity of a particular keypoint. Such a function may be represented as f(zk), where f is the image intensity function and zk is the kth keypoint in an image. Other functions may also be applied, such a visual word in a visual word index.

Figure 18:
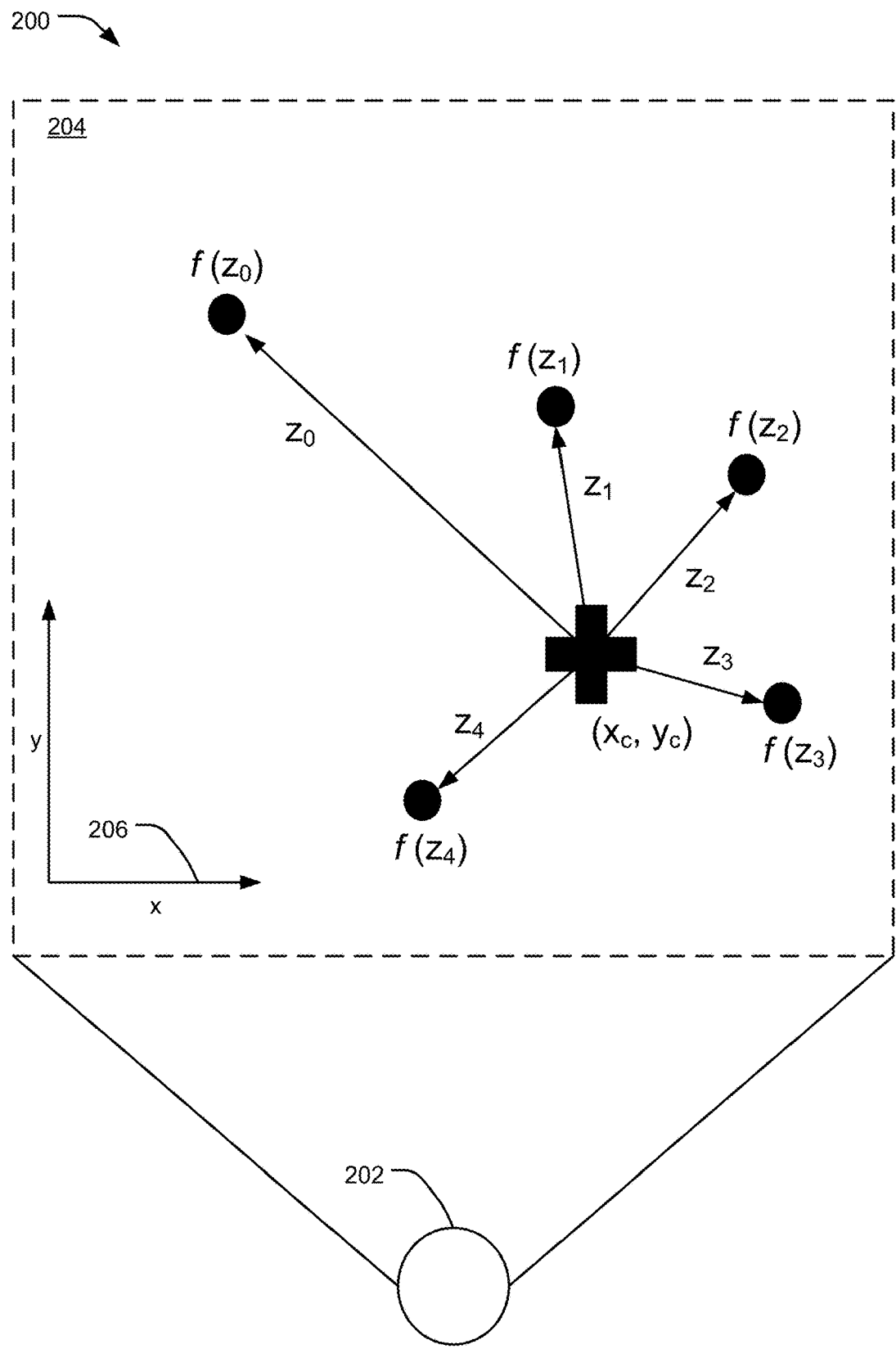
FIG. 18 illustrates a schematic of an image capture with a query point and a plurality of keypoints.

FIG. 18 illustrates a schematic diagram 200 of an image capture 204 taken by an image sensor 202 on a vehicle. The image capture 204 includes a query point (xc, yc) and a plurality of keypoints z0-z4. A query point is a point of interest that may or may not be a keypoint, for which the object detection and classification system may choose for further analysis. In an implementation, the object detection and classification system may attempt to determine whether a query point is the center of an object to assist in classification of the object.

Points in the image capture 204 may be described with reference to a Cartesian coordinate system wherein each point is represented by an ordered pair, the first digit of the pair referring to the point's position along the horizontal or x-axis, and the second digit of the pair referring to the point's position along the vertical or y-axis. The orientation of the horizontal and vertical axes with respect to the image 204 is shown by the axis 206. Alternatively, points in the image capture 204 may be referred to with complex numbers where each point is described in the form x+iy where i=√(−1). In another implementation, a query point may serve as the origin of a coordinate system, and the locations of keypoints relative to the query point may be described as vectors from the query point to each of the keypoints.

The image detection and classification system 110 uses a new descriptor function, to produce an evaluation of a query point in an image 204 that combines a representation of what the feature is and where the feature is located in relation to the query point into a single representation. For any image 204 with a set of keypoints z0-z4 in the neighborhood of a query point (xc, yc), the descriptor for the query point is as follows:

$$F(\zeta) = \frac{1}{N}\sum_{k=0}^{N-1}(z_k - z_c)e^{i2\pi f(z_k)\zeta} \qquad \text{Equation (1)}$$

where N is the number of keypoints in the image from the environment surrounding the vehicle in the neighborhood of the query point, zc is the query point represented in complex space, zk is the kth keypoint, f(zk) is the feature value of the kth keypoint, and $\zeta$ is the continuous independent variable of the descriptor function F($\zeta$).

To obtain a descriptor that is invariant to scale and orientation, Equation (1) may be modified by letting $z_m$ be the mean value of zk values:

$$z_m = \frac{1}{N}\sum_{k=0}^{N-1}(z_k - z_c) \quad \text{Equation (2)}$$

By dividing the right-hand side of Equation (1) by |zm|, a scale invariant version of the descriptor is obtained. On the other hand, by dividing both sides of Equation (1) by $$\frac{z_m}{|z_m|}$$

a rotation-invariant version of the descriptor is obtained. In order to write a descriptor that is invariant in both scale and orientation, dividing by zm yields the following descriptor:

$$F(\zeta) = \frac{1}{z_m}\sum_{k=0}^{N-1}(z_k - z_c)e^{i2\pi f(z_k)\zeta} \quad \text{Equation (3)}$$

The division by N is omitted from Equation (3) since the contribution of the keypoint number is already neutralized through the division by $z_m$. Due to the similarity of Equation (3) to the formula for the Inverse Fourier Series, Equation (3) may be referred to herein as a Fourier Fan.

Since Equation (3) is a function of a continuous variable ζ, it may be sampled for use in the object detection and classification system 100. In an implementation, a sampling frequency greater than 2 max(f) may be chosen where max( ) indicates the maximum value of the function f. Another characteristic of Equation (3) is that it is infinite over the domain of the variable ζ. Sampling an infinite equation will result in an infinite number of samples, which may not be practical for use in the object detection and classification system 100. If Equation (3) is a periodic function, however, then it would be sufficient to sample one only a single period of Equation (3), and to ignore the remaining periods. In an implementation, Equation (3) is made to be periodic by requiring all values of the function f to be integer multiples of a single frequency f0. As such, for Equation (3) to be able to be sampled, the function f must have a known maximum, and for the Equation (3) to be periodic, the function f must be quantized such that the values of f are integer multiples of f0.

In an implementation, the function f may represent more than a simple feature, such as the image intensity. Instead, the function f may be a descriptor function of each of the keypoints, such as those referred to herein (e.g., SIFT and/or SURF descriptors). Such descriptors are usually not simple scalar values, but rather are more likely to be high dimensional feature vectors, which cannot be incorporated directly in Equation (3) in a trivial manner. It is, however, possible to incorporate complex descriptors as feature values by clustering the descriptors in an entire set of training data and to use the index of the corresponding cluster as the value for f. Such cluster centers may be referred to as "visual words" for f. Let fk be the descriptor for a keypoint k, if fk takes integer values, e.g., 3, then there is a descriptor at the keypoint located at zk-zc, which can be assigned to cluster 3. It should be appreciated that, in this example, f is quantized and the number of clusters is the function's maximum which is known. These characteristics are relevant because they are the characteristics of f needed to make Equation (3) able to be sampled and periodic.

In an implementation, an order is imposed on the visual word cluster centers, such that the output of f is not a categorical value. In other words, without an order, the distance between cluster 2 and cluster 3 is not necessarily less than the distance between cluster 2 and cluster 10 because the numerical values are merely identifiers for the clusters. An order for the visual words may be imposed using multidimensional scaling (MDS) techniques. Using MDS, one can find a projection into a low dimensional feature space from a high dimensional feature space such that distances in the low dimensional feature space resemble as much as possible distances in the high dimensional feature space. Applied to the visual words using MDS, the cluster centers may be projected into a one-dimensional space for use as a parameter for f. In one implementation, a one-dimensional feature space is chosen as the low dimensional feature space because one dimensional space is the only space in which full ordering is possible.

The object detection and classification system may be tuned according to a set of training data during which parameters for the system may be chosen and refined. For example, descriptor values and types may be chosen, the size of the neighborhood around a query point may be set, the method of choosing keypoints, the number of keypoints chosen per image, etc. may also be chosen. Since the tuning of the object detection and classification system is a type of machine learning, it may be susceptible to a problem known as "overfitting." Overfitting manifests itself when machine classifiers over-learn the training data leading to models which do not generalize well on other data, the other data being referred to herein as "test data." In the descriptor of Equation (3), overfitting could occur if, on training data, the object detection and classification system overfits the positions of the keypoints with respect to the query point. Changes in the positions of the keypoints that are not present in training data, which could occur due to noise and intra-class variance, will not always be handled well by the object detection and classification system when acting on test data. To address the issue of overfitting, at each query point (xc, yc), instead of extracting a single Fourier Fan Equation (3) on training data, multiple random Fans may be extracted, denoted by the set Mf (e.g., 15f). Each of the random Fans contains only a subset of the available N keypoints in the neighborhood of the query point (xc, yc). Later, when the object detection and classification system is running on test data, the same set Mf of random Fourier Fans is extracted, and the result is confirmed according to majority agreement among the set of random Fourier Fans. Random Fourier Fans also allow the object detection and classification system to learn from a small number of images since several feature vectors are extracted at each object center.

In the comparison of Equation (3), the "Fourier Fan," to the formula for the inverse Fourier Series, it should be understood that there are some differences between the two. For example, only those frequencies that belong to the neighborhood of a query point are available for each Fourier Fan. As another example, shifting all coefficients zk by a constant za, i.e. a shift of the object center, is not equivalent to adding a Dirac impulse in the ζ domain, even if it is assumed that the same keypoints are available in the new query point neighborhood. This is true because the addition of za is not a constant everywhere, but only to the available frequencies, and zero for the other frequencies.

Figure 19:
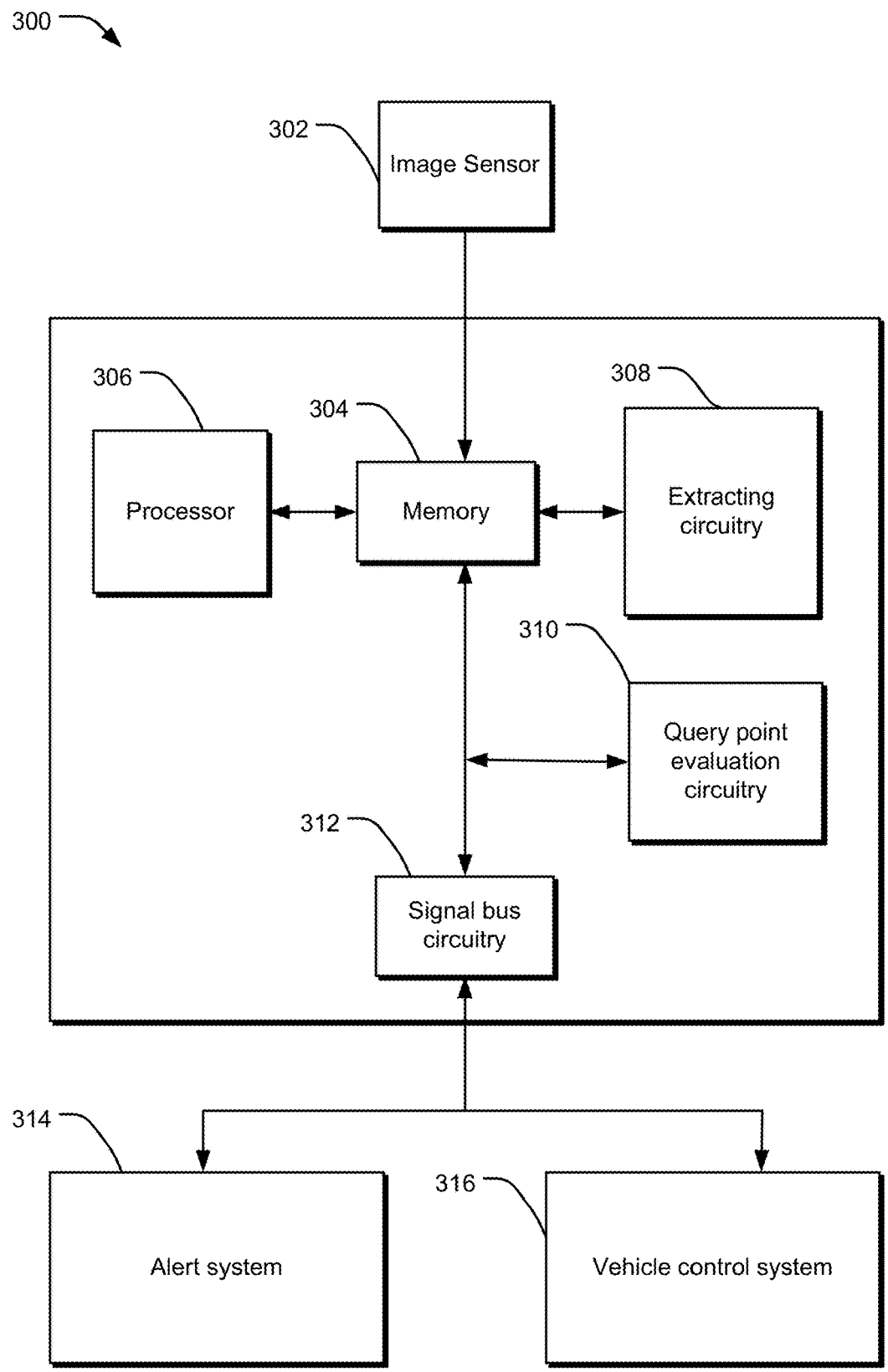
FIG. 19 illustrates a block diagram of a system that may be useful in implementing the implementations disclosed herein.

FIG. 19 illustrates a block diagram of an object detection and classification system 300 that may be useful for the implementations disclosed herein. The object detection and classification system 300 includes an image sensor 302 directed at the environment surrounding a vehicle. The image sensor 302 may capture images of the environment surrounding the vehicle for further analysis by the object detection and classification system 300. Upon capture, an image from the environment surrounding a vehicle may be stored in the memory 304. The memory 304 may include volatile or non-volatile memory and may store images captured by the image sensor as well as data produced by analysis of the images captured by the image sensor. A processor 306 may carry out operations on the images stored in memory 304. The memory 304 may also store executable program code in the form of program modules that may be executed by the processor 306. Program modules stored on the memory 304 include without limitation, hazard detection program modules, image analysis program modules, lens obstruction program modules, blind spot detection program modules, shadow detection program modules, traffic sign detection program modules, park assistance program modules, collision control and warning program modules, etc.

The memory 304 may further store parameters and settings for the operation of the object detection and classification system 300. For example, parameters relating to the training data may be stored on the memory 304 including a library of functions f and keypoint settings for computation and calculation of Random Fourier Fans. The memory 304 may further be communicatively coupled to extracting circuitry 308 for extracting keypoints from the images stored on the memory 304. The memory 304 may further be communicatively coupled to query point evaluation circuitry 310 for taking image captures with keypoints and associated keypoint data and evaluating the images with keypoints and keypoint data according to Fourier Fans to produce sampled Fourier Fan values.

If the sampled Fourier Fan values produced by the query point evaluation circuitry 310 meet a potential hazard condition, then signal bus circuitry 312 may send a signal to an alert system 314 and/or a vehicle control system 316. Sampled Fourier Fan values may first be processed by one or more program modules residing on memory 304 to determine whether the sampled values meet a potential hazard condition. Examples of sampled values that may meet a potential hazard condition are an object determined to be a collision risk to the vehicle, an object that is determined to be a vulnerable road user that is at risk of being struck by the vehicle, a road sign object that indicates the vehicle is traveling in the wrong part of a road or on the wrong road, objects that indicate a stationary object that the vehicle might strike, objects that represent a vehicle located in a blind spot of the operator of the vehicle.

If the sampled values of a Fourier Fan function satisfy a potential hazard condition, the signal bus circuitry 312 may send one or more signals to the alert system 314. In an implementation, signals sent to the alert system 312 include acoustic warnings to the operator of the vehicle. Examples of acoustic warnings include bells or beep sounds, computerized or recorded human language voice instructions to the operator of the vehicle to suggest a remedial course of action to avoid the cause the of sample value meeting the potential hazard condition. In another implementation, signals sent to the alert system 314 include tactile or haptic feedback to the operator of the vehicle. Examples of tactile or haptic feedback to the operator of the vehicle include without limitation shaking or vibrating the steering wheel or control structure of the vehicle, tactile feedback to the pedals, such as a pedal that, if pushed, may avoid the condition that causes the sample value of the Fourier Fan to meet the potential hazard condition, vibrations or haptic feedback to the seat of the driver, etc. In another implementation, signals sent to the alert system 314 include visual alerts displayed to the operator of the vehicle. Examples of visual alerts displayed to the operator of the vehicle include lights or indications appearing on the dashboard, heads-up display, and/or mirrors visible to the operator of the vehicle. In one implementation, the visual alerts to the operator of the vehicle include indications of remedial action that, if taken by the operator of the vehicle, may avoid the cause of the sample value of the Fourier Fan meeting the potential hazard condition. Examples of remedial action, include an indication of another vehicle in the vehicle's blind spot, an indication that another vehicle is about to overtake the vehicle, an indication that the vehicle will strike an object in reverse that may not be visible to the operator of the vehicle, etc.

In another implementation, if the sampled values of a Fourier Fan function satisfy a potential hazard condition, the signal bus circuitry 312 may send one or more signals to the vehicle control system 316. Examples of signals sent to the vehicle control system 316 include signals to the steering system to alter the direction of the vehicle in an attempt to avoid the object that is the cause of the sampled values of the Fourier Fan function to satisfy the potential hazard condition. In another implementation, a signal sent to the vehicle control system 316 may include signals to sound the horn of the vehicle to alert the object that caused the sample values of the Fourier Fan function to satisfy the hazard condition that the vehicle with the object detection and classification system is present. In yet another implementation, the signal sent to the vehicle control system 316 include a signal to engage the brakes of the vehicle to avoid a collision with the detected object.

Figure 20:
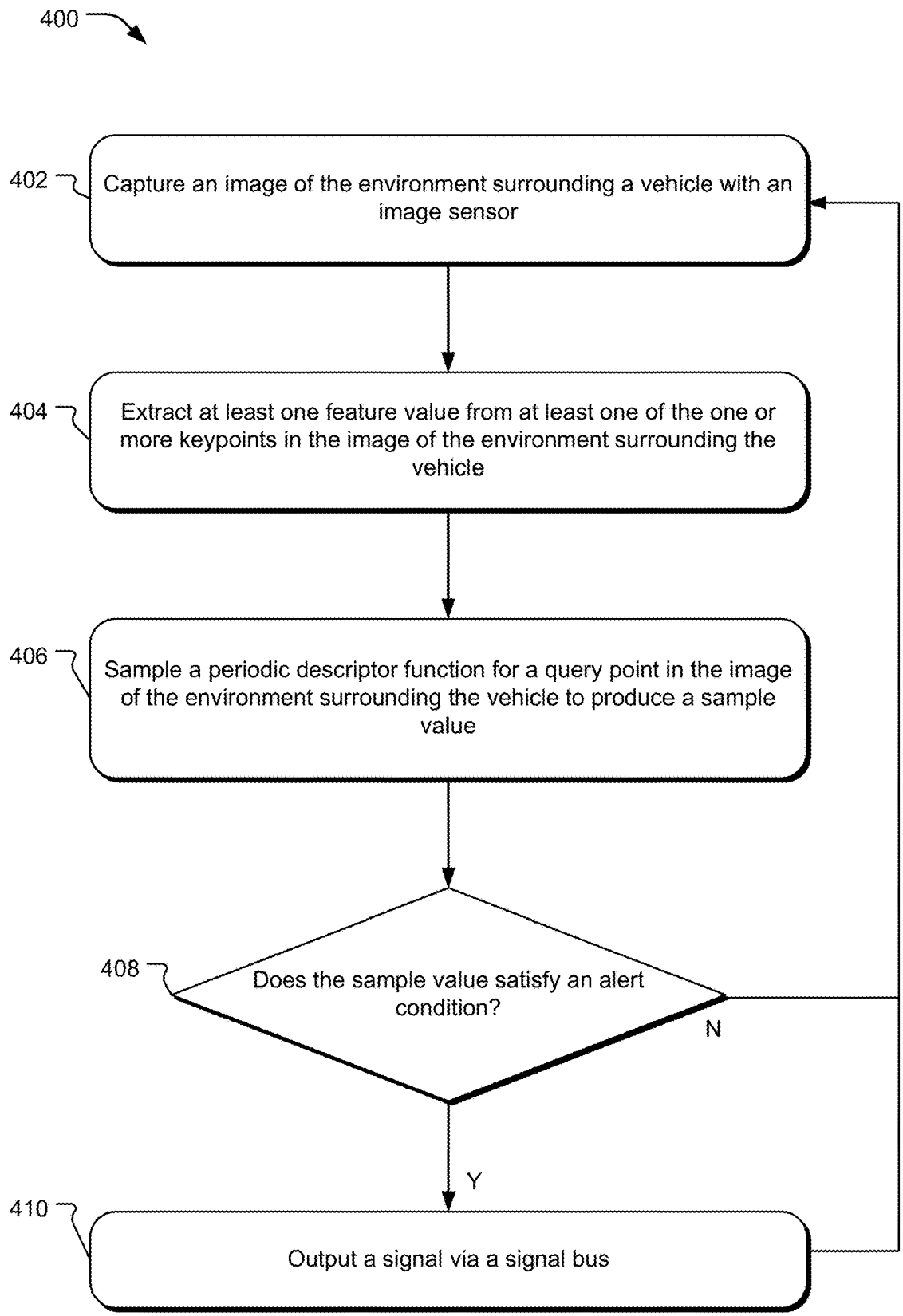
FIG. 20 illustrates example operations for detecting and classifying an object and transmitting a signal to an alert system and/or to a vehicle control system.

FIG. 20 illustrates example operations 400 for detecting and classifying an object and outputting a signal if a sample value of a Fourier Fan meets a potential hazard condition. A capturing operation 402 captures an image from the environment surrounding a system with an image sensor, the image from the environment surrounding the system having one or more keypoints. The image from the environment surrounding the system may be captured by an image sensor mounted anywhere on the system. In one implementation, the system is a vehicle. The captured image may be stored in a memory in an object detection and classification system. Once stored, a processor may execute a keypoint detection program module to identify the keypoints. Alternatively, or additionally, extracting circuitry may identify the keypoints in the image. The keypoints may be identified according to a number of methods, such as methods provided by third party libraries, and data parameters for the methods, such as the number of keypoints to extract or conditions for a keypoint extraction may be stored on the memory in the object detection and classification system.

Extracting operation 404 extracts at least one feature value from at least one of the one or more keypoints in the image from the environment surrounding the system. A processor may execute a feature value extraction program module to extract the features values of keypoints. Alternatively, or additionally, extracting circuitry may extract the feature values of keypoints in the stored image. The feature value of a keypoint may be determined according to a function f. In some embodiments, the function f may have certain characteristics for use in a Fourier Fan Equation: having a known maximum, such that a sampling rate may be set to 2 max(f), and being periodic, such that only one period of f need be sampled.

Sampling operation 406 samples a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the vehicle. In an implementation, the sampled periodic descriptor function in sampling operation 406 is Equation (3).

At decision block 408, if the sample value of the periodic descriptor function does not meet a potential hazard condition, then the method ends or returns to capturing operation 402. If the sample value of the periodic descriptor function does meet a potential hazard condition, then outputting operation 410 sends a signal via a signal bus. The signal sent via the signal bus in outputting operation 410 may be to an alert system of a vehicle, which may display an acoustic or visual signal to the operator of the vehicle regarding the object that is the cause of the sample value exceeding the potential hazard condition. In another embodiment, the signal bus sends at outputting operation 410 a signal to a vehicle control system. The system sent to the vehicle control system may cause the vehicle to change speed or direction without intervention from the operator of the vehicle to avoid a collision with the object that caused the sample value to exceed the potential hazard condition.

Figure 21:
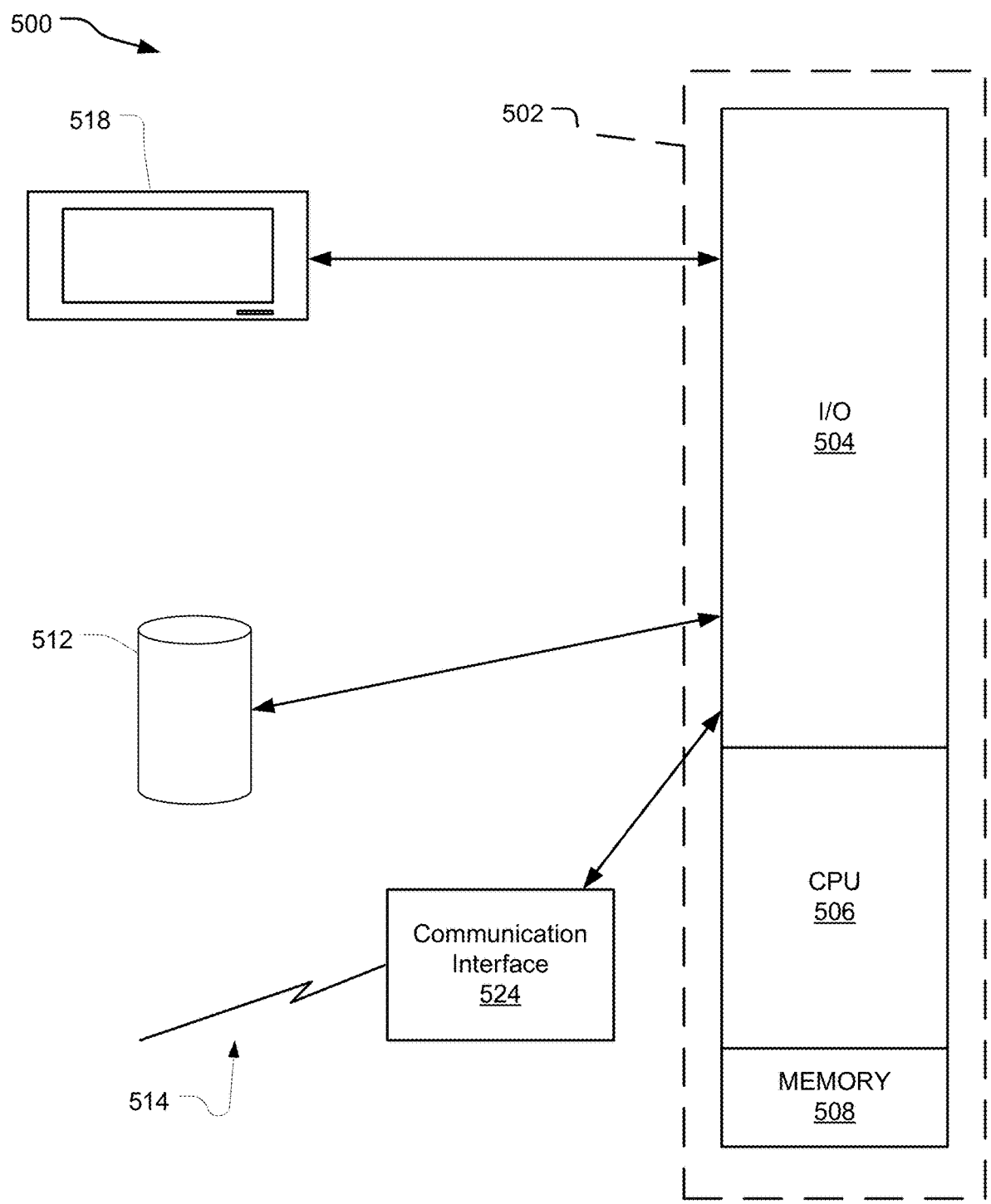
FIG. 21 discloses a block diagram of an example processor system suitable for implementing one or more aspects of an object detection and classification system with Fourier fans.

FIG. 21 discloses a block diagram of a processor system 500 suitable for implementing one or more aspects of an object detection and classification system with Fourier fans. The processor system 500 is capable of executing a processor program product embodied in a tangible processor-readable storage medium. Data and program files may be input to the processor system 500, which reads the files and executes the programs therein using one or more processors. Some of the elements of a processor system 500 are shown in FIG. 21 wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The processors may be single core or multi-core processors. The described technology is optionally implemented in software loaded in memory 508, a disc storage unit 512, and/or communicated via a wired or wireless network link 514 on a carrier signal (e.g., Ethernet, 3G wireless, 5G wireless, LTE (Long Term Evolution)) thereby transforming the processing system 500 in FIG. 21 to a special purpose machine for implementing the described operations. The disc storage unit 512 may include volatile memory, non-volatile memory, solid state memory, flash memory, hybrid, and/or traditional magnetic rotating data storage media.

The I/O section 504 may be connected to one or more user-interface devices (e.g., a mobile device, a touch-screen display unit 518, etc.) or the disc storage unit 512. Processor program products containing mechanisms to effectuate the systems and methods in accordance with the described technology may reside in the memory section 508 or on the storage unit 512 of such a system 500.

A communication interface 524 is capable of connecting the processor system 500 to an enterprise network via the network link 514, through which the processor system 500 can receive and/or send instructions and data embodied in a carrier wave. The communication interface 524 may receive signals and data representing an image from the environment surrounding the system via an image sensor. The communication interface may send signals from the processor system 500 to the image detection and classification system including without limitation audible alert signals sent to the operator of a vehicle, data signals sent to a HUD (heads-up-display) visible to the operator of a vehicle, a video screen such as display 518 that is visible to the operator of a vehicle for display of information regarding objects and/or alerts, a vehicle control signal for altering the control of a vehicle to avoid a hazard, etc.

When used in a local area networking (LAN) environment, the processor system 500 is connected (by wired connection or wirelessly) to a local network through the communication interface 524, which is one type of communications device. When used in a wide-area-networking (WAN) environment, the processor system 500 typically includes a modem, a network adapter, or any other type of communications device for establishing communications over the wide area network. In a networked environment, program modules depicted relative to the processor system 500 or portions thereof, may be stored in a remote memory storage device. It is appreciated that the network connections shown are examples of communications devices for, and other means of, establishing a communications link between the processor and other devices may be used.

In an example implementation, a network agent of an enterprise network may be embodied by instructions stored in memory 508 and/or the storage unit 512 and executed by the processor 502. Further, local computing systems, remote data sources and/or services, and other associated logic represent firmware, hardware, and/or software, which may be configured to transmit data outside of the enterprise network via the network agent. The network agent of the enterprise network may be implemented using a general-purpose computer and specialized software (such as a server executing service software), a special purpose computing system and specialized software (such as a mobile device or network appliance executing service software), or other computing configurations. In addition, data-selection policies and data transmission preparation policies may be stored in the memory 508 and/or the storage unit 512 and executed by the processor 502.

An example system includes an image sensor mounted on a system and configured to capture an image from the environment surrounding the system, the image from the environment surrounding the system including one or more keypoints, extracting circuitry configured to extract at least one feature value from at least one of the one or more keypoints in the image from the environment surrounding the system, query point evaluation circuitry communicatively coupled to the image sensor and the extracting circuitry and configured to classify an object by sampling a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the system, and a signal bus configured to transmit a signal to the operator of the system if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, zc is the query point represented in complex space, zk is the kth keypoint, f (zk) is the feature value of the kth keypoint, and $\zeta$ is the continuous independent variable of the descriptor function F($\zeta$).

An example system of any preceding system includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein:

$$z_m = \frac{1}{N}\sum_{k=0}^{N-1}(z_k - z_c).$$

An example system of any preceding system includes the signal transmitted to the operator of the system is an audible alert.

An example system of any preceding system includes the signal transmitted to the operator of the system is a visual alert.

An example system of any preceding system includes the signal transmitted to the operator of the system includes haptic feedback.

An example system of any preceding system includes the at least one feature value includes a visual appearance feature.

An example system of any preceding system includes the at least one feature value includes a visual word index in a dictionary of visual words, the visual word index having an order relation determined by multi-dimensional scaling.

An example system of any preceding system includes the feature values of the kth keypoint are integer multiples of a single frequency f0.

An example system of any preceding system includes the query point evaluation circuitry is further configured to sample a plurality of randomized descriptor functions, each randomized descriptor function including only a subset of the one or more keypoints.

An example system of any preceding system includes that the system is a vehicle.

An example system of any preceding system includes that the signal to the system is a vehicle control signal.

An example system includes means for capturing an image from the environment surrounding a system with an image sensor, the image from the environment surrounding the system having one or more keypoints. The example system further includes means for extracting at least one feature value from at least one of the one or more keypoints in the image from the environment surrounding the system. The example system further includes means for sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system. The example system further includes means for outputting an alert signal via a signal bus if the sample value satisfies an alert condition.

An example method includes capturing an image from the environment surrounding a system with an image sensor, the image from the environment surrounding the system having one or more keypoints, extracting at least one feature value from at least one of the one or more keypoints in the image from the environment surrounding the system, sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting an alert signal via a signal bus if the sample value satisfies an alert condition.

An example method of any preceding method includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, zc is the query point represented in complex space, zk is the kth keypoint, f (zk) is the feature value of the kth keypoint, and $\zeta$ is the continuous independent variable of the descriptor function F($\zeta$).

An example method of any preceding method includes that the alert signal results in an audible alert.

An example method of any preceding method includes that the alert signal results in a visual alert.

An example method of any preceding method includes that the alert signal results in haptic feedback to the operator of the system.

An example method of any preceding method includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example method of any preceding method includes that the feature values of the kth keypoint are integer multiples of a single frequency f0.

An example method of any preceding method includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta} \text{ wherein: } z_m = \frac{1}{N}\sum_{k=0}^{N-1}(z_k - z_c).$$

An example method of any preceding method includes that the sampling operation includes sampling a plurality of randomized descriptor functions, each randomized descriptor function including only a subset of the one or more keypoints.

An example system includes an image sensor mounted on a system and configured to capture an image from the environment surrounding the system, the image from the environment surrounding the system including one or more keypoints, one or more processors, and a memory storing processor-executable instructions to perform the operations of: extracting, by the processor, at least one feature value from at least one of the one or more keypoints in the image from the environment surrounding the system; sampling, by the processor, a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting, by the processor, an alert signal via a signal bus if the sample value satisfies an alert condition.

An example system of any preceding system includes that the periodic descriptor function is defined as follows:

$$F(\zeta) = \frac{1}{N} \sum_{k=0}^{N-1} (z_k - z_c) e^{i2\pi f(z_k)\zeta}$$

where N is the number of keypoints in the image from the environment surrounding the system in the neighborhood of the query point, zc is the query point represented in complex space, zk is the kth keypoint, f(zk) is the feature value of the kth keypoint, and $\zeta$ is the continuous independent variable of the descriptor function F($\zeta$).

An example system of any preceding system includes that the alert signal results in an audible alert.

An example system of any preceding system includes that the alert signal results in a visual alert.

An example system of any preceding system includes that the alert signal results in haptic feedback to the operator of the system.

An example system of any preceding system includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example system of any preceding system includes that the feature values of the kth keypoint are integer multiples of a single frequency f0.

An example system of any preceding system includes that the periodic descriptor function is a scale-invariant or rotation-invariant function defined as follows:

$$F(\zeta) = \frac{1}{z_m} \sum_{k=0}^{N-1} (z_k - z_c) e^{i2\pi f(z_k)\zeta} \text{ wherein: } z_m = \frac{1}{N} \sum_{k=0}^{N-1} (z_k - z_c).$$

An example system of any preceding system includes the sampling operation includes sampling a plurality of randomized descriptor functions, each randomized descriptor function including only a subset of the one or more keypoints.

Figure 22:
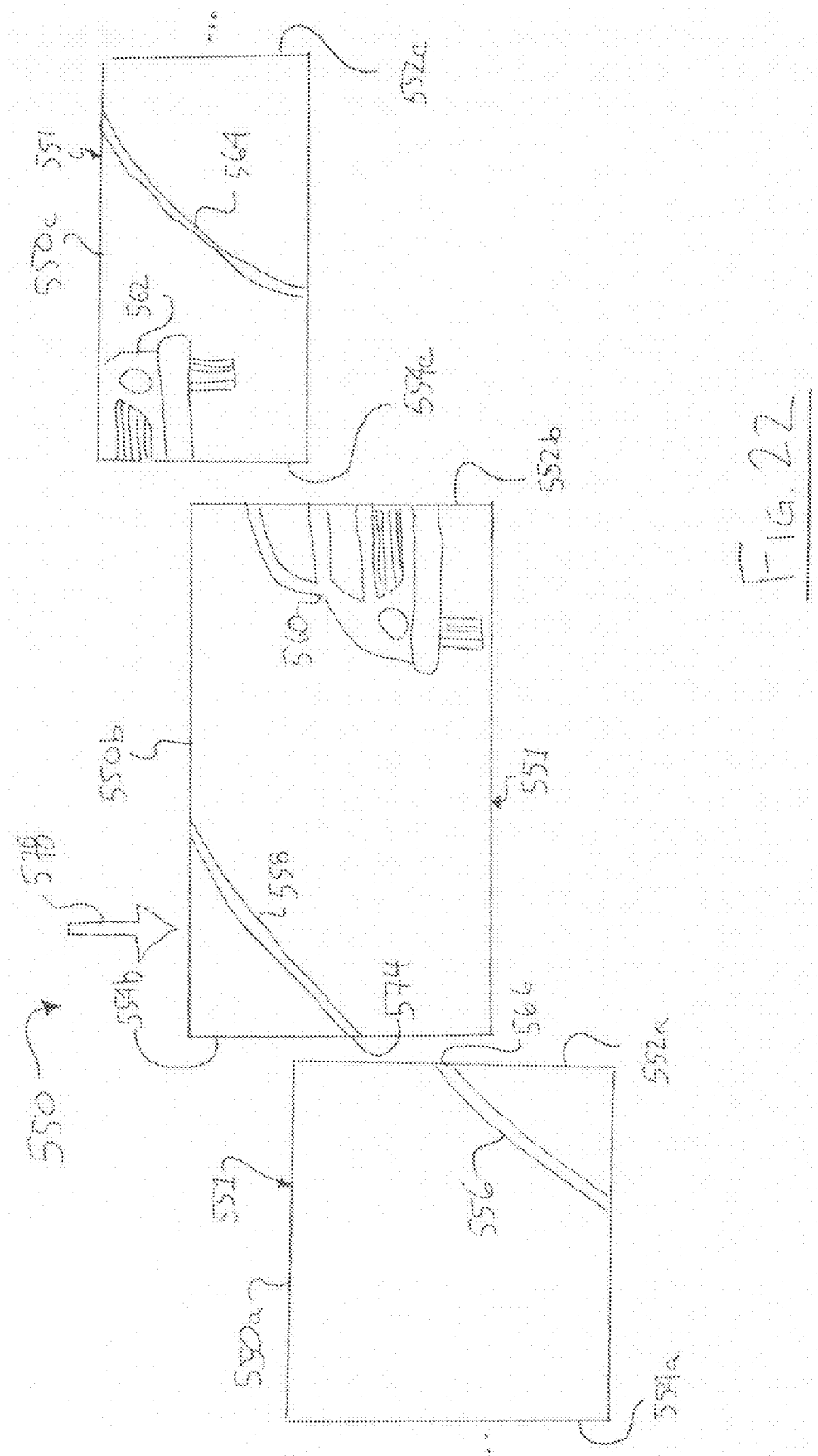
FIG. 22 discloses a schematic of multiple image captures that are stitched together to form a single image.

Referring to FIG. 22, a plurality of images 550 are generally shown. The images 550 could be collected from a single sensor or from a plurality of different sensors and/or sensor types. FIG. 22 shows different sized images to represent the collection of these images by different sensor types. Each of these images 550 has a set of primary edges 551, which are generally the outer edges of the images 550.

Of the three images 550a, 550b, 550c, each has a first edge 552a, 552b, 552c and a second edge 554a, 554b, 554c. All of the three images 550a, 550b, 550c shown has at least an object within the image. In a first image 550a, the object 556 is a portion of an edge of a road. In the second image 550b, another portion 558 of the edge of the road and a portion of a vehicle 560 are the two objects found therein. And in the third image 550c, another portion of the vehicle 562 and a portion 564 of an edge of the road opposite the edge shown in images 550a, 550b are the two objects shown.

A method according to the invention will produce or stitch a single image from data collected in the plurality of images 550 captured by a system to simulate a mirror used as a rear-view mirror 1 of a vehicle 10. Referring to FIG. 23, the method is generally shown at 560. The method 560 begins at 562. The method 560 identifies the primary edges 551 of the plurality of images 550 at 564. The method 560 then locates a first border 566 within the first image 550a that extends to a part of a first edge 552a of the first image 550a at 568. In the example shown in FIG. 22, the first border 566 is an edge of the road, i.e., the object 556 in the first image 550a.

The method 560 then identifies at 570 secondary edges 551 of the second image 550b from the plurality of images 550. It then selects at 572 a second edge 554b from the secondary edges 551 that is closest in position and orientation to the part of the first edge 552a of the first image 550a. A second border 574 that extends to the second edge 554b is located at 576. The second image 550b is then adjusted at 577 such that a second part of the second border 574 of the second image 550b aligns with the first border 566 of the first image 550a.

This is graphically represented by an arrow 578 showing the adjustment of the second image 550b downwardly to align with the first image 550a. It should be appreciated by those skilled in the art that the reference to a downward movement only relates to the orientations as depicted in FIG. 22 and represents an example of an adjustment between two images 550a, 550b and that adjustment could include movements in different directions and different orientations. These adjustments may be due in part to the possible different sensor systems that may be employed. Another reason for adjustments is that the vehicle may jostle the images as it moves down the road due to imperfections in the road.

This method then determines at 580 whether all of the images 550 have been adjusted. If not, a new first image is selected at 582 and the is repeated iteratively by selecting first and second images until all of the plurality of images 550 have been adjusted to produce the single image. In order to properly repeat the method until all of the plurality of images 550 are adjusted, the second images in the prior iteration will become the first image. By way of example, the second image 550b will become the "first image" and another image 550c will become the "second image." This will be repeated until all of the images 550 are stitched or processed together to form a single image.

The image that is produced by the method may be rectified to remove distortion, or it may simulate a plane mirror reflection, an aspheric mirror reflection, a concave mirror reflection or any other type of visual aid deemed appropriate to display to a driver of a vehicle 10. The image may simulate a view similar to that produced by a wide-angle lens.

The method 560 may employ sensors that are designed to sense or detect electromagnetic radiation outside the visible spectrum. This may be useful when it is dark outside or if it is determined that a particular radiation pattern would be useful to display to a driver of the vehicle 10.

The implementations described herein may be implemented as processor-implemented methods, with circuitry such as ASIC designs, or any combination thereof. The system described herein may include a variety of tangible computer-readable storage media and intangible computer-readable communication signals. Tangible computer-readable storage can be embodied by any available media that can be accessed by the object detection and classification system and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions executable by a processor, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the object detection and classification system. In contrast to tangible computer-readable storage media, intangible computer-readable communication signals may embody computer readable instructions executable by a processor, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations A vehicle comprising displaying devices, processing devices and sensors such as cameras is also described in this disclosure. In or on the vehicle different displaying devices, processing devices and cameras as described before as well as additional devices and cameras can be installed, configured and interconnected.

The displaying devices can be mounted inside or outside the vehicle and can be used to transmit optical information to the driver and/or any person or object inside and outside of the vehicle. The display devices can also be configured to transmit information via haptics, acoustics, odors, chemicals and/or other forms of electromagnetic fields. The information is typically first collected from sensors and other signal receiving devices on or in the vehicle and then processed by processing devices. A multitude or only one processing device can be installed in the vehicle to process the pictures and information provided by the cameras and sensors. Optionally the processing devices can be remotely located and the vehicle is wirelessly connected to the remote processing unit. The processed information is then directed to the different displaying devices to inform the driver and/or any person or object inside and outside of the vehicle. Depending on the location of the displaying devices and the nature of the receiver, the output of different information with different output means is induced.

The display devices can also be configured to receive input from the driver and/or any person or object inside and outside of the vehicle. This input can be received via different sensing means, comprising for example photosensitive sensors, acoustic sensors, distance sensors, touch-sensitive surfaces, temperature sensors, pressure sensors, odor detectors, gas detectors and/or sensors for other kind of electromagnetic fields. This input can be used to control or change the status of the output of the displaying device and/or other components on or in the vehicle. For example, the field of view, the contrast, the brightness and/or the colors displayed on the display device, but also the strength of the touch feedback, sound volume and other adjustable parameters can be changed. As further examples the position or focus of a camera, the temperature or lighting inside the vehicle, the status of a mobile device, like a mobile phone, carried by a passenger, the status of a driver assistance system or the stiffness of the suspension can be changed. Generally, every adjustable parameter of the vehicle can be changed.

Preferably the information from the sensing means is first processed by a (sensing) processing device, but it can also be directly processed by the sensor means or the display device comprising a processing device. Preferably the display device comprises a multi-touch display so that the driver or any other passenger can directly react to optical information delivered by the display device by touching specific areas on the display. Optionally gestures, facial expression, eye movement, voice, sound, evaporations, breathing and/or postural changes of the body can also be detected, for example via an optical sensory means like a camera, and used to provide contact-free input to also control the display device.

Information stemming from multiple sources can be simultaneously displayed on a display of the display device. The information coming from different sources can either be displayed in separated parts of the display or the different information can be displayed side by side or overlaid together on the same part of the display.

Selecting a specific region on the display of the display device by for example touching it can trigger different functions depending on the circumstances. For example, a specific function can be activated or deactivated, additional information can be displayed or a menu can be opened. The menu can offer the choice between different functions, for example the possibility to adjust various parameter.

The adjustment of different parameters via a menu can be done in many ways, known from prior art and especially from the technology used in mobile phones with touch screen technology. Known are for example scrolling or sliding gestures, swiping, panning, pinching, zooming, rotating, single, double or multi tapping, short or long pressing, with one or more than one finger of one or more hands and/or any combination thereof.

A display device in combination with one or more cameras can be used to replace a rearview mirror, either an interior or an exterior rearview mirror. There are various advantages offered by this constellation. For example, can a display device together with a camera monitoring one side of the vehicle and one camera monitoring the rear of the vehicle replace an external rearview mirror. By combining the pictures of both cameras, for example by the image improvement system as described before, the blind spot zone is eliminated and an improved visibility is offered.

The display devices can be arranged inside the vehicle eliminating the need for exterior parts. This offers the advantage to smoothen the outer shape of the vehicle, reduces the air friction and therefore offers power and/or fuel savings.

The processing device can advantageously handle the input of multiple sources. Correlating the input data of the different sources allows for the reduction of possible errors, increases measurement accuracy and allows to extract as much information as possible from the available data.

When driving it is especially important to perceive possibly dangerous situations. One part of the processing device analyses the available data and uses different signaling means to enhance the perception of the situation by the driver especially by the detection and classification system described before. For example, can an object recognition and classification algorithm be used to detect different objects surrounding the vehicle, for example based on the pictures acquired by one or more cameras. Comparing the pictures for different points in time or using supplementary sensor data gives information about the relative movement of objects and their velocity. Therefore, objects can be classified into different categories, for example dangerous, potentially dangerous, noted for continued observance, highly relevant, relevant, irrelevant.

From all the information, a level of danger attributed with each object can be derived. Depending on the danger level or other important parameters, the perception of objects for the driver can be enhanced by using different signaling means to display on the displaying device, for example highlighting the objects with specific colors, increased brightness, flashing messages, warning signs and/or using audio messages. The overall danger level or the highest danger level can also be displayed by special warning signs, like an increased brightness, a colorful border around the whole or specific parts of the display, constant in time or flashing with increasing or decreasing frequency. The information displayed on the display device is highly situational and is reevaluated according to the updated information from the various sensors and information sources. An emergency vehicle or a station can for example broadcast an emergency message to allow for vehicles and the driver of the vehicles for an improved reaction to possible dangerous situations or to clear the path for emergency operations. A vehicle involved in an accident or dangerous situation can also broadcast a message to call the attention of other vehicles and their drivers to those situations.

A further adjustment possibility of the simulated exterior mirror is the function of adapting the field of view to the driver's position. As in a conventional mirror, which is adapted by an electric drive to the perspective of the driver, the mirror adjustment' of the plane mirror simulation is done by moving section A on the optical sensor, so that other pixels of the optical sensors are visualized. The number of pixels, and therefore the size of the section, is not changed. This adjustment is indicated by the arrows in FIG. 9.

For a convex mirror, the adjustment to the perspective of the driver is not connected with simply moving a pixel section, but rather with a recalculation of the image.

This modification might be restricted to modifications securing that legally prescribed view areas are still shown to the driver. Alternatively, the driver might receive a warning message in case the modification leads to a view area that is not fulfilling the legally prescribed view areas.

In further embodiments, additionally and/or alternatively the displayed image might be presented to the driver, especially in separated form, by a plurality of display devices. This allows to present specific details to the driver. Preferably also in this embodiment that driver is warned in case the area displayed on a respective display device is not covering a legally prescribed view area. Alternatively, it is possible to always display the legally prescribed view area on a main display device and display the specific details on a separate display device only when necessary.

The whole control of the exterior mirror simulation is done by control elements, which are used in the conventional way on the vehicle door or on the dashboard.

A rearview device is a type of device generally fulfilling the legal requirements for rear view devices in vehicles, preferably motor vehicles. Therefore, such a rear-view device provides an image of the rear area, substantially as provided for example in the state-of-the-art using an interior mirror or a camera system and a display device, and of the lateral and backside areas lying diagonal to the sides, substantially as provided for example in the state-of-the-art using external rearview mirrors or camera systems and display devices, the image satisfying at least the legal requirements.

Such a rearview device within the subgroup of devices for indirect view and as such the tasks, aims and the solutions described in this invention can also be used for indirect view devices. Examples are images and views of objects which are not in the field of view of the driver, i.e. the directions opposing, left, right, below and above of the viewing direction, but also the view along the direction of the viewing direction of the driver and/or any combinations of the directions can be comprised. The view of the driver can be insufficient in particular also in the viewing direction, for example the view can be obstructed by vehicle parts of the vehicle itself, such as for example parts of the vehicle body, in particular the A-pillar, the roof construction and/or the engine hood, and the view can be obstructed by other vehicles and/or objects outside of the vehicle, obstructing the view in such a way that the driver can perceive the situation not completely satisfyingly or only incompletely. Additionally, it is possible that the driver is not able to perceive the situation in or beside the viewing direction in such a way to allow him to control the vehicle according to the present situation. Therefore, a rearview device can be adapted to reprocess the information according to the abilities of the driver to allow for a best possible perception of the situation.

It is also one aspect of the present invention to provide a rearview device which can operate outside of the legal requirements and which can then be admitted for operation either by exceptional permissions or an adaption of the legal requirements. Such a rearview device can be especially inventiveness since it provides a solution outside of the predefined well-known framework.

The rearview device can also be equipped with different illumination devices.

Different functions and devices can be incorporated into and/or controlled with the help of rearview devices, comprising especially also cameras.

Especially useful are functions and devices to enhance, extend and/or sustain the functionality of the rearview device during normal or extreme conditions. This can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore, it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rearview devices comprise also illumination devices, for example any kind of light module like an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A vehicle comprising at least two camera systems and processing means are disclosed in German patent application No. 102012025322, filed on Dec. 22, 2012 for MOTOR VEHICLE WITH CAMERA-DISPLAY-SYSTEM and hereby incorporated herein by reference. A process for the visualization of the surrounding area around a vehicle is disclosed in German patent application No. 102012002149, filed on Feb. 12, 2012 for VISUALIZATION PROCESS OF THE SURROUNDING OF A VEHICLE and hereby incorporated herein by reference. A vision system for vehicles for displaying the image of a rear-view mirror and of a wide-angle mirror is disclosed in European patent application No. 2623374, filed on Jan. 16, 2013 for VISION SYSTEM FOR UTILITY VEHICLES and hereby incorporated herein by reference.

A vehicle comprising an electronic rear view mirror is disclosed in European patent No. 2822812, filed on Dec. 19, 2012 for MOTOR VEHICLE WITH AN ELECTRONIC MIRROR and hereby incorporated herein by reference. A locking system adapted for unlocking in case of emergency is disclosed in German patent application No. 102012004792, filed on Mar. 7, 2012 for EMERGENCY UNLOCKING LOCKING SYSTEM and hereby incorporated herein by reference.

An example for a rearview device comprising an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back-vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, comprising at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear-view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, comprising a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can comprise in particular a plurality of different optical elements, comprising a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can comprise for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also, an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It comprises for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSIS- TANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements known to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also comprise cleaning elements to clean the optical element facing outwards and being exposed to the environment. The cleaning element can for example comprise wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also, light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high-pressure cleaners can be used on the housing of the camera module as described in U.S. patent application Ser. No. 13/090,127, which is hereby incorporated herein by reference.

Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can comprise a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for producing a single image from data collected in a plurality of images captured by an optical system to simulate a mirror used as a rear-view mirror of a vehicle, the method comprising the steps of:
   identifying primary edges of a first image of the plurality of images;
   locating a first border within the first image that extends to part of a first edge of the first image;
   identifying secondary edges of a second image of the plurality of images;
   selecting a second edge from the secondary edges closest in position and orientation to the part of the first edge of the first image;
   locating a second border within the second image that extends to the second edge; and
   adjusting the second image such that a second part of the second border of the second image aligns with the first border of the first image,
   wherein the optical system simultaneously simulates both a plane mirror and a spotter mirror in form of an aspheric mirror in the single image to provide a plurality of optical subsystems.

2. A method as set forth in claim 1, wherein the plurality of optical subsystems includes a system designed to detect electromagnetic radiation outside the visible spectrum.

3. A method as set forth in claim 1, wherein the step of identifying secondary edges includes identifying secondary edges of a second image of the plurality of images closest in position and orientation to at least part of the first edge of the first image.

4. A method as set forth in claim 1, wherein the step of adjusting includes a step of generating an overall image using the first and second images.

5. A method as set forth in claim 4, further comprising a step of rectifying visual distortion in the single image.

6. A method as set forth in claim 1, wherein a portion of the secondary edges and a portion of the first edge overlap.

7. A method as set forth in claim 6, wherein the portion of the first image includes a part of the secondary edges and the first edge.

8. A method as set forth in claim 1, further comprising a step of iteratively selecting first and second images until all of the plurality of images have been adjusted to produce the single image.

9. A method as set forth in claim 8, wherein the step of adjusting includes a step of generating an overall image using the plurality of images.

10. A method as set forth in claim 9, further comprising a step of rectifying visual distortion in the single image.

11. A method as set forth in claim 1, further comprising a step of classifying an object by sampling a periodic descriptor function for a query point in the image from the environment.

12. A method for producing a single image from data collected in a plurality of images captured by an optical system to simulate a mirror used as a rear-view mirror of a vehicle, the method comprising the steps of:
- identifying primary edges of a first image of the plurality of images;
- locating a first border within the first image that extends to part of a first edge of the first image;
- identifying secondary edges of a second image of the plurality of images;
- selecting a second edge from the secondary edges closest in position and orientation to the part of the first edge of the first image;
- locating a second border within the second image that extends to the second edge;
- adjusting the second image such that a second part of the second border of the second image aligns with the first border of the first image;
- classifying an object by sampling a periodic descriptor function for a query point in the image from the environment; and
- extracting at least one feature value from at least one of one or more keypoints in an image from an environment to assist in the step of classifying the object, wherein the optical system simultaneously simulates both a plane mirror and a spotter mirror in form of an aspheric mirror in the single image to provide a plurality of optical subsystems.

13. A method for producing a single image from data collected in a plurality of images captured by an optical system to simulate a mirror used as a rear-view mirror of a vehicle, the method comprising the steps of:
- identifying primary edges of a first image of the plurality of images;
- locating a first border within the first image that extends to part of a first edge of the first image;
- identifying secondary edges of a second image of the plurality of images;
- selecting a second edge from the secondary edges closest in position and orientation to the part of the first edge of the first image;
- locating a second border within the second image that extends to the second edge;
- adjusting the second image such that a second part of the second border of the second image aligns with the first border of the first image; and
- stitching the first image and the second image together to form a single image,
- wherein the optical system simultaneously simulates both a plane mirror and a spotter mirror in form of an aspheric mirror in the single image to provide a plurality of optical subsystems.

* * * * *